United States Patent [19]

Yoshimura et al.

[11] Patent Number: 4,807,336
[45] Date of Patent: Feb. 28, 1989

[54] LINK DEVICE FOR STRETCHING SHEET MATERIAL AND STRETCHING APPARATUS USING SAID LINK DEVICE

[75] Inventors: Hiroshi Yoshimura; Yuichi Tagami, both of Otsu, Japan

[73] Assignee: Toray Industries, Inc., Tokyo, Japan

[21] Appl. No.: 910,360

[22] Filed: Sep. 22, 1986

Related U.S. Application Data

[63] Continuation of Ser. No. 574,714, Jan. 27, 1984, abandoned.

[51] Int. Cl.⁴ ............... B29C 55/16; D06C 3/04
[52] U.S. Cl. .................................. 26/73; 26/93; 26/71
[58] Field of Search ............... 26/72, 73, 93, 71; 264/290.2

[56] References Cited

U.S. PATENT DOCUMENTS

| | | | |
|---|---|---|---|
| 3,046,599 | 7/1962 | Nicholas et al. | 26/73 |
| 3,148,409 | 9/1964 | Bruckner | 26/73 |
| 3,247,544 | 4/1966 | Bromley | 26/73 |
| 3,276,071 | 10/1966 | Nagae et al. | 26/73 |
| 3,491,402 | 1/1970 | Shindo et al. | 26/73 |
| 3,580,451 | 5/1971 | Fraitzl | 26/93 X |
| 3,748,704 | 7/1973 | Schmidt et al. | 26/93 |
| 3,890,421 | 6/1975 | Nabozit | 26/72 X |
| 3,916,491 | 11/1975 | Kampf | 26/72 |

FOREIGN PATENT DOCUMENTS 44-7155  3/1969  Japan ..................... 26/73

Primary Examiner—Robert R. Mackey
Attorney, Agent, or Firm—Birch, Stewart, Kolasch, & Birch

[57] ABSTRACT

A link device for stretching a sheet material consists of pantograph-like link member units having a sub-link held substantially at a right angle to the running direction and rollers fitted to said sub-link. Due to the low running resistance of the rollers and the pantograph-like structure composed of long and short links, an endless guide-rail can be introduced in the stretching apparatus for a sheet material and the running of the chain can be stabilized, thereby resulting in a high-speed stable stretching operation. Reduction of the running resistance makes it easy to adjust the stretching ratios according to the desired stretching conditions.

17 Claims, 21 Drawing Sheets

LINK DEVICE FOR STRETCHING SHEET MATERIAL AND STRETCHING APPARATUS USING SAID LINK DEVICE

This application is a continuation of application Ser. No. 574,714, filed on Jan 27, 2984, now abandoned.

BACKGROUND OF THE INVENTION

1. Field of the Invention

The present invention relates to a link device or a linkage for stretching a sheet material, for instance a thermo-plastic synthetic resin film, in the longitudinal, transverse or biaxial direction and to a stretching apparatus using said link device.

2. Description of the Prior Art

Biaxial simultaneous stretching apparatuses using a link mechanism for a continuous synthetic resin film are proposed in Japanese Patent Publication No. SHO 43-5560 and Japanese Patent Publication No. SHO 44-7155.

The stretching apparatus disclosed in Japanese Patent Publication No. SHO 43-5560 has a pair of stretching devices provided at opposite sides along the longitudinal direction of the stretching apparatus. Each of the stretching devices comprises an endless link device comprising a plurality of link members arranged to form a pantograph structure, a plurality of sliding shoes provided at the bottom side of the endless link device, means for circulating the endless link device and a rail unit to slidably guide the sliding shoes. The means for circulating the endless link device comprises a first sprocket provided at the entrance of the stretching apparatus and a second sprocket provided at the exit of the stretching apparatus. The endless link device is meshed with the sprockets. The rail unit is provided between a position where the endless link device leaves from the first sprocket and a position where the endless link device connects with the second sprocket. The rail unit has an outside rail, a central rail and an inside rail. A first gauge between the outside and inside rails becomes narrow in the direction from the first sprocket to the second sprocket to reduce the height of and to expand the length of the pantograph structure for applying a longitudinal stretching action to the film. The sliding shoes comprise a series of outside shoes slidably in contact with the outside rail, a series of central shoes slidably in contact with the central rail and a series of inside shoes slidably in contact with the inside rail. Each of the shoes is in contact with each of the rails at the bottom and side surfaces thereof. The gauge between the rail units provided at both sides along the stretching apparatus becomes wide in the direction from the first sprocket to the second sprocket to apply a transverse stretching action to the film.

In the stretching apparatus disclosed in Japanese Patent Publication No. SHO 43-5560 mentioned above, an extremely large driving force is required on the sprocket, because the endless link device is supported movably on the rail via sliding shoes which slide in contact with the surface of the rail unit. In the stretching apparatus, moreover, the shoes are in surface contact with the rails at their side surfaces and are forcibly slid along the rails while moving from the entrance to the exit of the rails. This mechanism is a toggle mechanism and it brings about quite a large force acting between the rails and the shoes. Existence of such action runs counter to the expectation of stability of circulation of the endless link device at a high speed operation of the stretching apparatus. In the stretching apparatus, further, it is not possible to provide the rail unit around the sprockets because if the rail unit is provided around the sprockets, there occurs an interference between the force acting on each of the sprockets and the force acting on each of the shoes through the endless link device meshing with each of the sprockets. Thus, in the stretching apparatus, the rail unit is provided only between both of the sprockets. Such an arrangement of rail unit is not suitable for high speed operation of the stretching apparatus because the shoes have to engage on and have to disengage from the rail at the entrance of the sprocket and at the exit of the sprocket, respectively. In the stretching apparatus, furthermore, since a very large force acts on the rails as mentioned above, it is necessary to use rigidly built rails. When changing a stretching ratio in the longitudinal direction, it is necessary to change the gauge between the outside rail and the inside rail. Changing the gauge between the rigidly built rails on the rail unit cannot be accomplished with a simple mechanism for varying and adjusting the gauge. Accordingly, in the stretching apparatus, a rail unit is changed with another one having a different gauge between the outside rail and the inside rail for varying the stretching ratio. This word causes workers in a factory substantial problems. Actually, therefore, the factory has to prepare several stretching apparatuses having different gauges to produce stretched films having different streching ratios if the factory wants to do so.

Japanese Patent Publication No. SHO 44-7155 teaches a stretching apparatus similar to the stretching apparatus shown in Japanese Patent Publication No. SHO 43-5560 mentioned above except for rotatable rollers provided to support the endless link device on the rail unit instead of the sliding shoes. Each of the rotatable rollers for supporting the weight of the endless link device is constructed by a caster roller which is swingable in a horizontal plane. Also in this embodiment, the stability of circulation of the endless link device at high speed can not be accomplished, because the caster rollers receive centrifugal force during travel of the endless link device around the sprockets and the directions of the caster rollers become unstable at that time. This phenomenon was clearly observed on the practical operation of the stretching apparatus having the same construction disclosed in Japanese Patent Publication No. SHO 44-7155 at a speed of about 200 m/min. or more.

SUMMARY OF THE INVENTION

An object of the present invention is to realize high-speed running of a special link in order to eliminate the above-mentioned drawbacks.

Another object of the present invention is to make it possible to drive the link device and stretch the sheet material with stability even at a high speed.

Still another object of the present invention is to provide a link device which can easily change the stretching ratio of the sheet material and a stretching apparatus using said link device.

To accomplish these objects, in the link device of the present invention a pantograph-like link member unit consists of two kinds of link members, i.e., long and short ones, and the links of the same length in the link member unit are adjacently arranged in the running direction of the link member unit. To the link member unit is added a sub-link which maintains a position normal to the running direction of the link member unit.

A roller is fitted to the sub-link. Moreover to the link member unit is attached a guide-roller to regulate the degree of folding of the link member unit. A gripper to grip the side edge of the sheet material is fitted to the sub-link or to the link member unit.

In the stretching apparatus of the present invention, at both sides of the sheet material, there are provided a pair of rail units which regulate the relative positions of the guide-rollers and change the transverse stretching ratio of the sheet material. Each of the rail units consists of a pair of guide-rails and the gauge of the guide-rails is set so as to change the longitudinal stretching ratio of the sheet material.

In the present invention thus constituted, the pantograph-like link member unit is not supported on sliders but supported on rollers. The rollers, attached to the sub-link which is attached substantially at a right angle to the running direction of the link member unit such that the rollers can move in the running direction of the link member unit, can rotate smoothly. As a consequence the total running resistance of the endless chain is extremely reduced as compared with the conventional one. Accordingly, the endless chain can be driven with a small force and in the section where the link member units mesh with the sprocket, the force which is caused by the interference between the sprocket and the rail through the link member units can be reduced.

Moreover, since the link member unit consists of long and short link members, it is possible to mesh the link member unit with the drive sprocket in the state where the short link is stretched to the limit or nearly to the limit, thereby avoiding any extremely large force caused by the interference between the drive sprocket and the rail through the link member units. Thus, it is not necessary to cut off the rail, even in the above mentioned section, and as a consequence, high speed running can be attained with the rail made endless.

Moreover, since the force acting between the rail and the link is reduced even in sections other than in the above mentioned section, on account of the lower running resistance of the rollers, stable running at high speed can be realized. Furthermore, since the sub-link is directed substantially at a right angle to the running direction of the link member unit and the rollers always moves with stability in the running direction, the link member unit can run at a high speed with stability. Thus stretching of the sheet material can be accomplished at high speed and with stability.

Also, since the force acting on the rail is small due to a decrease in the running resistance, the gauge of the guide-rails, which regulate the degree of folding of the link member unit through regulation of the relative positions of the rollers, can be easily changed by a small force. Therefore, an adjuster for adjusting the gauge between the guide-rails can be installed and the degree of folding of the link member unit can be easily changed in accordance with the necessary production requirements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects of the present invention will become more apparent and more readily appreciated from the following detailed description of the presently preferred exemplary embodiment of the present invention when taken in conjunction with the accompanying drawings, wherein.

DETAILED DESCRIPTION OF THE PREFERRED EMBODIMENTS

Several embodiments of the present invention will be described below.

Figure 1:
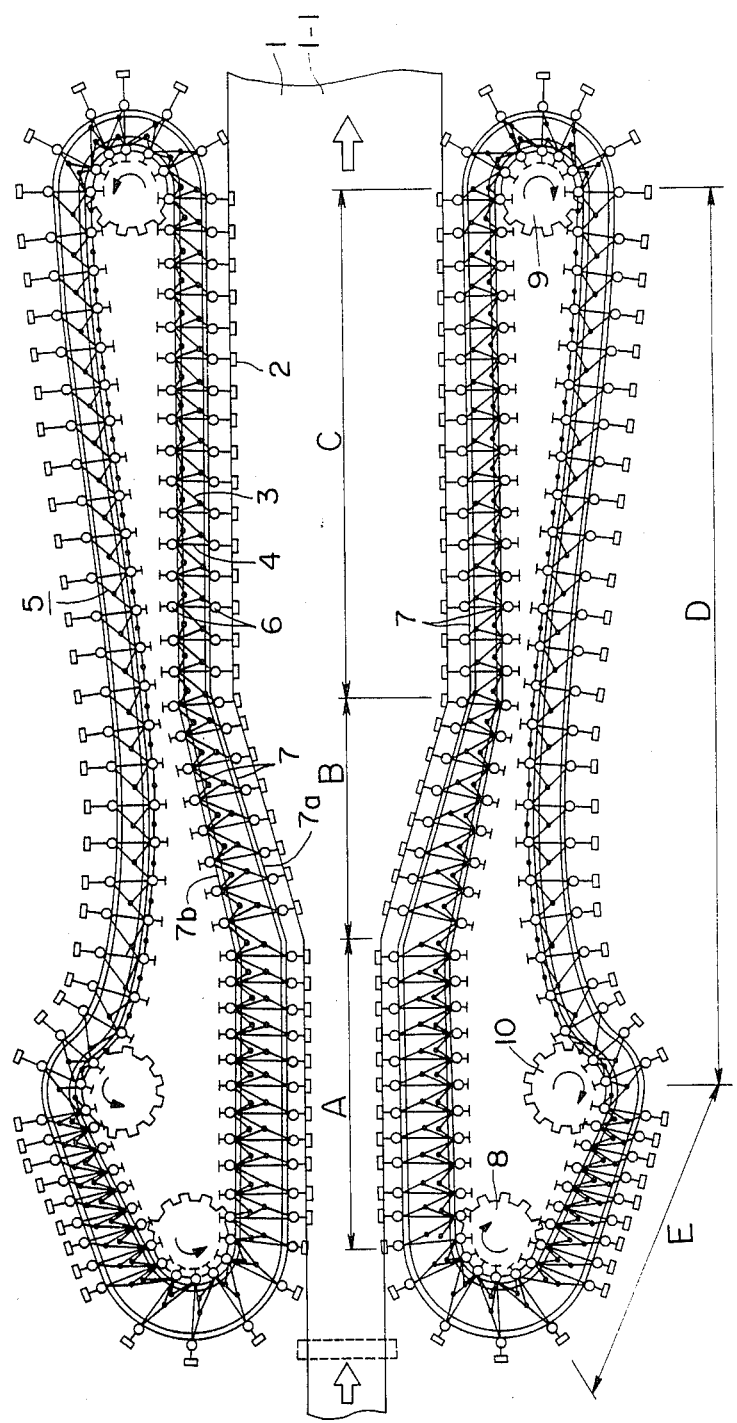
FIG. 1 is a schematic plan view showing a biaxial simultaneous stretching apparatus as one embodiment of the present invention.
Figure 2:
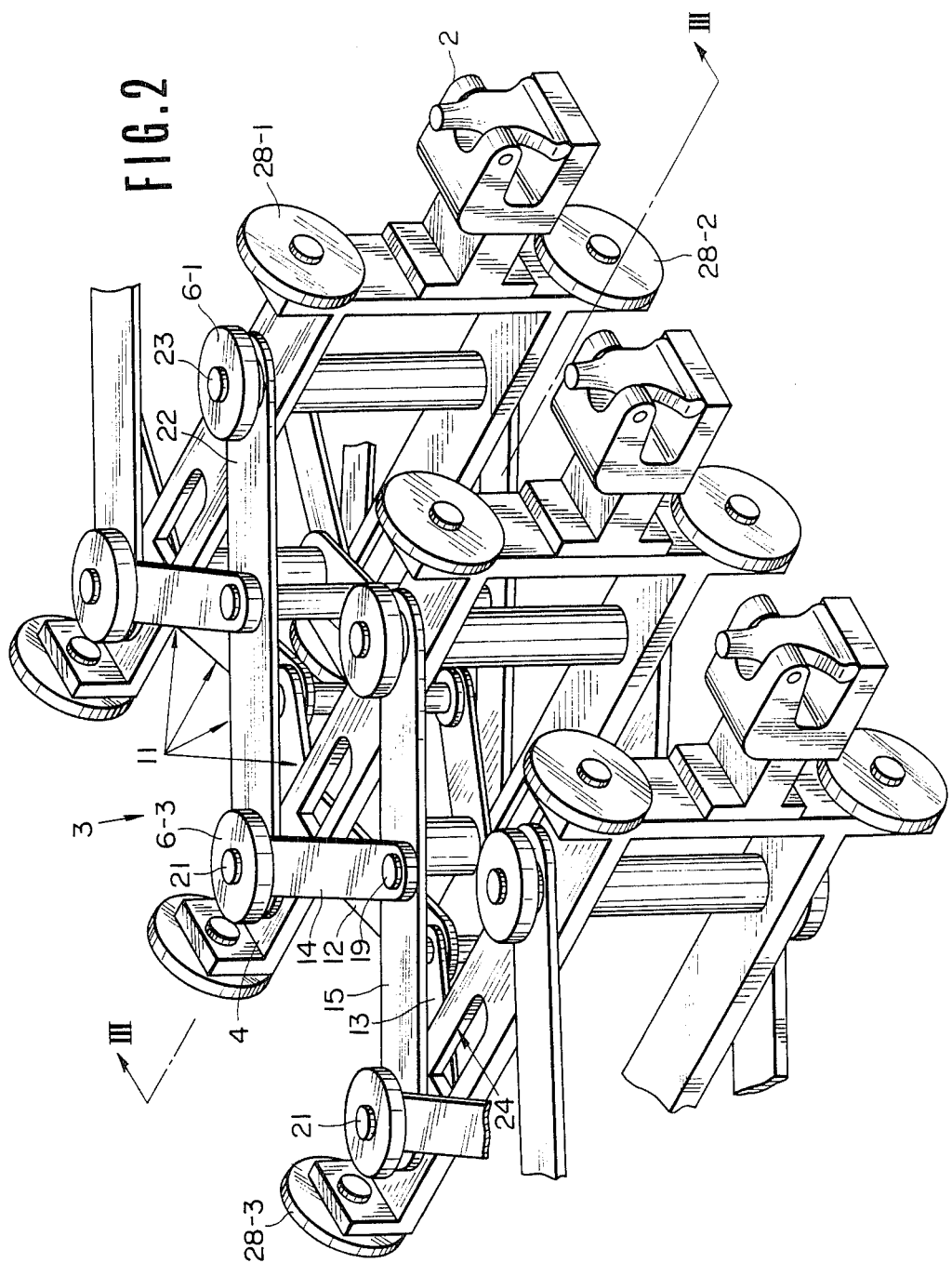
FIG. 2 is a partial oblique view of a link device illustrated in FIG. 1.

In FIG. 1 which illustrates a biaxial simultaneous stretching apparatus for a sheet material according to the present invention, a film 1—1 as a sheet material 1 to be stretched is transported in the direction of the arrow. The film 1—1 is clipped by the grippers 2, stretched biaxially in the longitudinal and transverse directions while being transported in the direction of the arrow. Each gripper 2 is attached to the sub-link 4 fitted on the pantograph-like link member unit 3. The sub-link 4 is held substantially at a right angle to the running direction of the link member unit 3. A plurality of such link member units 3 are connected together, forming an endless chain 5 in a loop form.

A roller 6 is attached to the link member unit 3. The roller 6 engages a guide-rail 7. There are provided a pair of rail units. One rail unit is provided for each endless chain 5. Each rail unit is composed of a pair of guide-rails 7. The guide-rail 7 is endless and the travel path of the link member unit 3 is regulated by the guide-rail 7.

The endless chain 5 is driven by sprockets. In the present example, three sprockets 8, 9, 10 are provided for each endless chain 5. For a drive sprocket, sprocket 9, or 10 is preferable.

The link member unit 3 is foldable, that is, can be shortened or lengthened through the movement of a plurality of link members which constitute the unit 3. The angle of folding of the link member unit 3 depends on the relative positions of the rollers 6 and the relative positions of the rollers 6 depend on the gauge of guide-rails 7. The angle of folding regulates the pitch of sub-links 4 and the pitch of grippers 2.

In this example, the pitch of grippers 2 is set short on the pre-heating section A for the film 1—1. On the stretching section B following the pre-heating section A, the pitch of grippers 2 is gradually widened and at the same time the running path of the gripper 2 is gradually spread toward the end of the stretching section B. Thus, the film 1—1 which is clipped on both side edges with the grippers 2 is stretched at the same time in the longitudinal direction and in the transverse direction in the stretching section B. In the heatset section C following the section B, the pitch of grippers 2 is set nearly constant. After the gripper 2 releases the film and then is turned at the sprocket 9, the pitch of grippers 2 is made the longest in a longest gripper pitch section D. Then in a decreasing pitch section E following section D, the pitch of grippers 2 is reduced to the same pitch as that of the pre-heating section A. Through this cycle of lengthening and shortening of the gripper pitch, the film 1—1 can be continuously transported and stretched.

Next, referring to FIGS. 2-5, a description of the pantograph-like link member unit 3 will be made.

The link member unit 3 includes short and long link members 11 connected foldably like a pantograph. The pantograph arrangement is as follows. There are short links 12 and 13, and long links 14 and 15. As indicated in FIG. 3, this arrangement is symmetric with respect to the upper and lower side thereof, that is, the upper side of the pantograph is composed of short links 12-1 and 13-1 and long links 14-1 and 15-1, while the lower side of the pantograph is composed of short links 12-2 and 13-2, and long links 14-2 and 15-2.

Short links 12 and 13 are connected together by means of a connecting pin 17 provided at the junction 16, and long links 14 and 15 are connected together by means of a connecting pin 19 provided at the junction 18. Short link 12 and long link 14 as well as short link 13 and long link 15 are connected together by a connecting pin 21 at the junction 20. Adjacent link member units 3 are connected together by the connecting pin 21.

Long link 15 has an extended portion 22 on the side of the connecting pin 19. The extended portion 22 is about as long as the distance between the connecting pin 21 and the connecting pin 19 for long link 15. Between the extended portion 22 and the junction 20 is disposed the sub-link 4. The sub-link 4 is swingably connected with the extended portion 22 via the connecting pin 23. Thus the connecting pin 23 constitutes the junction between the sub-link 4 and the extended portion 22. The sub-link 4 is swingably connected with the junction 20 by the connecting pin 21. Meanwhile, the connecting pin 21 and the sub-link 4 are mutually slidable in a long slot 24 formed on the sub-link 4. Thus being rigidly connected at the connecting pin 23 and slidably connected at the connecting pin 21 against the link member unit 3, the sub-link 4 can always be held substantially at a right angle to the running direction of unit 3.

Figure 3:
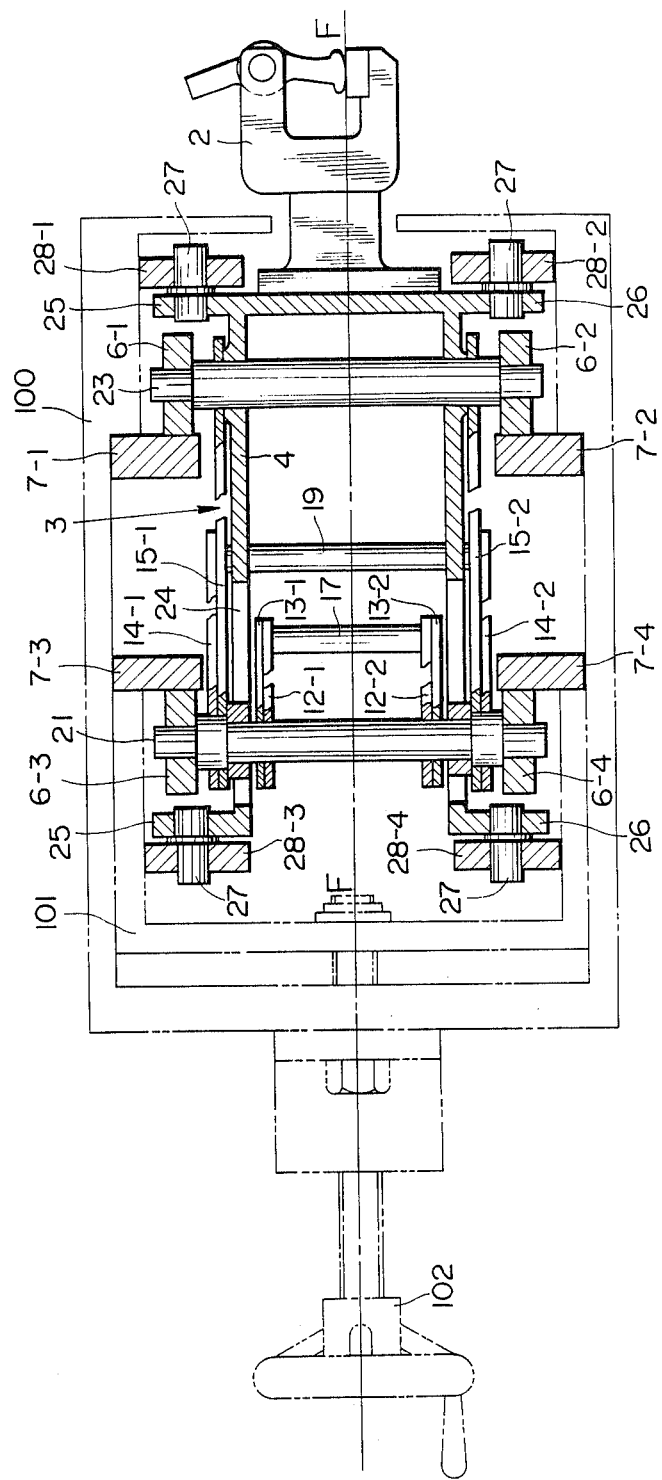
FIG. 3 is a vertical sectional view taken along the line III—III of FIG. 2.

As seen from FIG. 3, the sub-link 4 is an element with a laterally extending U-shaped section in the vertical direction. On the top side and bottom side of the laterally extending U-shaped element, there are provided an upward extending portion 25 and a downward extending portion 26. The upward extending portion 25 and the downward extending portion 26 each has a support 27 fixed thereto. Each support 27 has a roller 28 which supports the link member unit 3 and carries the sub-link 4 in the running direction of the link member unit. The roller 28 is rotatably held on the support 27.

A gripper 2 for clipping on the side edge of the sheet material protrudes from the midway portion of the vertically extending portion of the sub-link 4.

At the upper and lower ends of the connecting pins 21 and 23, there are fitted guide-rollers 6 which are rotatable in the horizontal plane. It is preferred that the guide-rollers are arranged vertically symmetric with respect to the plane F—F in which the sheet material is held by the gripper 2.

The guide-rollers 6 engages the guide-rails 7. Thus, the guide-rollers 6-1 and 6-2 fitted to the connecting pin 23, respectively, engage the guide-rails 7-1 and 7-2.

Meanwhile the guide-rollers 6-3 and 6-4 fitted to the connecting pin 21, respectively, engage the guide-rails 7-3 and 7-4. The guide-rails 7-1 and 7-2 are attached to the rail 100. The guide-rails 7-3 and 7-4 are attached to the rail 101 which is slidably fitted to the rail 100. The rollers 28 roll on the rails 100 and 101. Thus the rollers 28-1 and 28-2 move on the rail 100, while the rollers 28-3 and 28-4 move on the rail 101.

To the rail 101 is connected a gauge adjuster 102 which slides and shifts the rail 101 against the rail 100. Therefore, if the guide-rails 7-1, 7-2 are called guide-rail 7a and the guide-rails 7-3, 7-4 are called guide-rail 7b, the gauge between the guide-rail 7a and the guide-rail 7b can be adjusted by the action of the gauge adjuster 102. As modeled in FIG. 5, the degree of folding of the link member unit and the pitch of grippers 2 can be determined by adjusting the gauge between the guide-rails 7a and 7b.

In this example, with the above construction, guide-rails 7 are arranged according to the stretching ratio of the sheet material 1, and the gauge between the guide-rails 7a and 7b in a pair of guide-rails 7 is adjusted according to the stretching ratio of the sheet material 1 to be stretched. Thus, through a spread-out arrangement of the guide-rails 7 provided on both sides of the sheet material 1, the running paths of the link member unit 3 which stretches the sheet material 1 in the transverse direction and of the gripper 2 can be determined. Meanwhile, through a gauge adjustment between the guide-rails 7a and 7b by the gauge adjuster 102, the variation of the pitch of grippers 2 which stretch the sheet material 1 in the longitudinal direction can be determined.

The stretching in the longitudinal direction and in the transverse direction takes place simultaneously in the stretching section B.

The link member unit 3 runs supported on the rollers 28. The running resistance of the roller 28, which is free to roll, is remarkably lower than that of the slider of the conventional apparatus. Moreover, in the roller 28 which is fitted to the sub-link 4, the direction of its rotational movement invariably coincides with the running direction of the link member unit 3, resulting in a low stabilized running resistance. The guide-roller 6 is equally rotatable and accordingly the running resistance remains equally low between the guide-rollers 6-3, 6-4 and guide-rails 7-3, 7-4 to which is applied the stretching force of the sheet material 1. As a result, the total running resistance of the endless chain 5 is maintained low, and it is possible to drive the endless chain 5 with a small force.

As the driving force decreases, the force is reduced which is likely to be caused by the interference between the sprocket and the guide-rails 7-3, 7-4 through the link member unit 3. Since the link member unit 3 is composed of long and short link members, it is possible to make the link member unit 3 engage with the sprocket 10 when the short links 12 and 13 are stretched nearly to the limit, and, as illustrated in FIG. 1, the sprocket 10 is taken as the drive sprocket. Thus, it is possible to make the direction of the drive force transmitted from the drive sprocket 10 via short links 12, 13 to the link member unit 3 coincide with the running direction of the link member unit 3, thereby making it possible to avoid the force caused by the interference between the sprocket 10 and the guide rails 7 through the link member unit 3. Therefore, unlike in the conventional apparatus, it is not necessary to cut off the guide-rail 7 between the entrance and exit of the sprocket, and it is easy to make the guide-rail 7 endless.

Since the guide rollers do not disengage from or engage with the guide rail at the entrance or exit of the sprocket due to the endless guide rail, the endless chain 5 runs smoothly, facilitating high speed running.

Even in the pre-heating section A, the stretching section B, and the heatset section C, the roller 28 provides an effect of reducing the running resistance of the link member unit 3. Since the force to drive the endless chain 5 becomes small according to the decrease of the running resistance, the force of the guide roller 6 with which it grasps the guide rail 7 decreases, thereby decreasing the total running resistance of the endless chain. Moreover, as stated above, the roller 28 rolls always in the running direction of the link member unit and therefore the running resistance is maintained constant. Thus, the link member unit 3 is driven smoothly and stably with a high speed, and accordingly the stable stretching of the sheet material 1 is obtained.

Since the force acting on the guide-rail 7 is small, the gauge between the guide-rails 7-3, 7-4 and the guide-rails 7-1, 7-2 can be easily adjusted by the gauge adjuster 102. Thus, the longitudinal stretching ratio of the sheet material 1 can be set or changed easily and continuously. Further, it is possible to design such a rail structure in which a gauge adjuster 102 can be installed outside of the system. Therefore, the procedures necessary for changing the longitudinal stretching ratio in the conventional apparatus such as an exchange of rail or sprocket are unnecessary and the work required for changing the streching ratio can be simplified.

Unlike the slider in the conventional apparatus, the roller 28 yields the following benefits. First, the consumption of the lubricant to be supplied between the rail and the roller 28 can be drastically decreased as compared with the use of the slider, resulting in a remarkable reduction in the amount of lubricant splashing on the film. Also, according to a reduction of the amount of iron powder produced by running of the endless chain, the quality of a film is improved drastically. Meanwhile, a decrease of abrasion compared with the slider will prolong the life of the apparatus and cut back the expense for maintenance.

In the link member unit 3 of this example, the link members 11 and the guide-rollers 6 are arranged symmetrically with respect to the plane in which the sheet material 1 is held. As a consequence, the loads generating in any member of link member units 3 are well balanced. Accordingly, there is no generation of a moment and twisting force making the running unstable and an excellent characteristic for high-speed running can be guaranteed.

However, where the stretching force of the sheet material is small and high speed running is not required, it is not necessary to arrange the link members 11 and the guide-rollers 6 symmetric.

Next another embodiment of the link device for the sheet material will be described.

Figure 6:
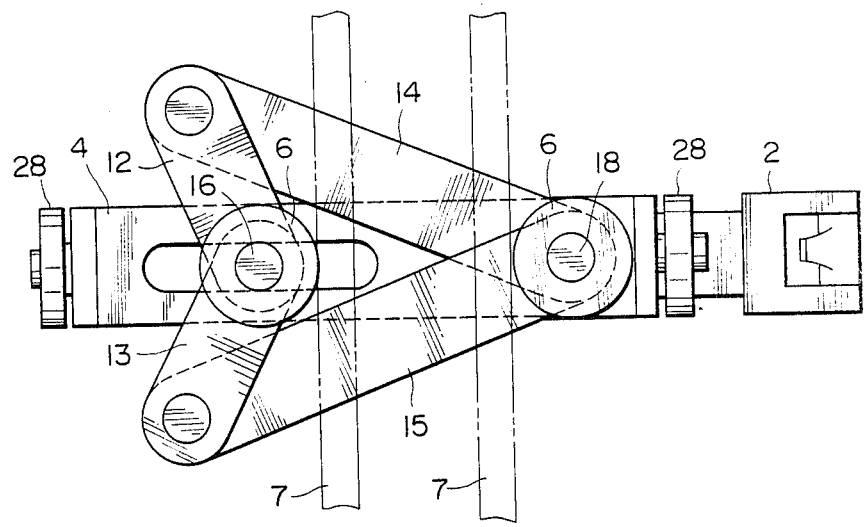
FIG. 6 is a plan view of a variation of a link device according to the present invention.
Figure 7:
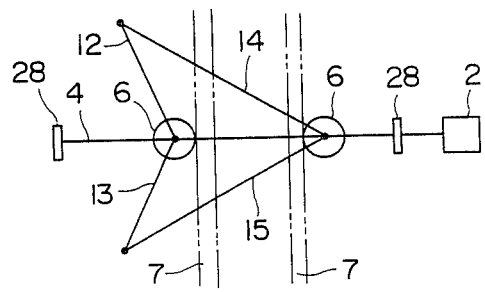
FIG. 7 is a plan view of a model of the link device illustrated in FIG. 6.

In the example illustrated in FIGS. 6 and 7, the sub-link 4 lies over the junction 18 of long links 14 and 15 and the junction 16 of short links 12 and 13 in the link member unit 3.

Figure 4:
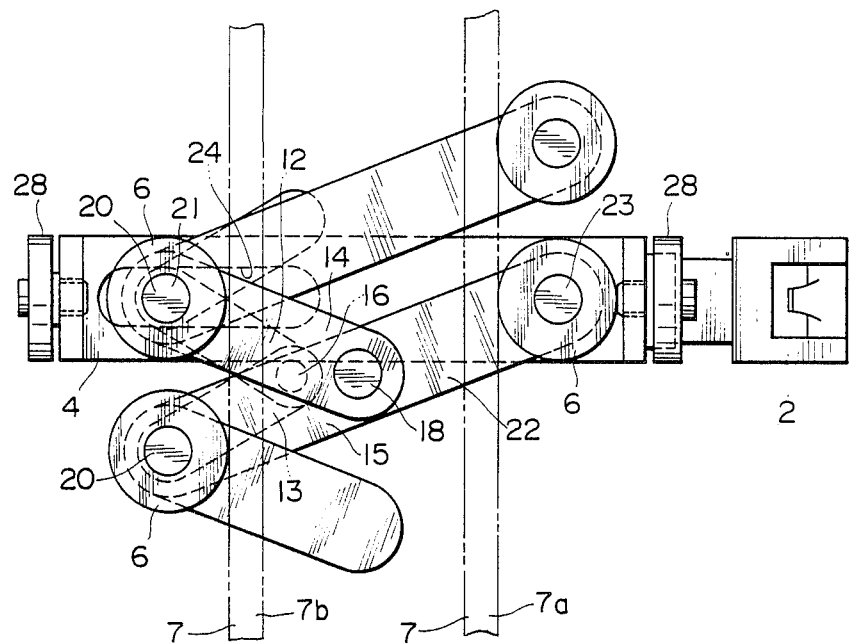
FIG. 4 is a plan view of the device shown in FIG. 2.
Figure 5:
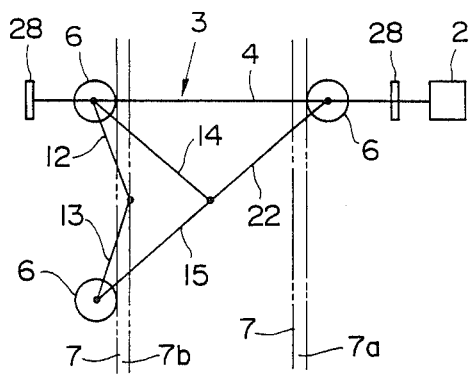
FIG. 5 is a plan view of a model of the link device in FIG. 4.

Such a link mechanism requires a smaller number of members and yields a more simple structure than the link mechanism shown in FIG. 4.

Figure 8:
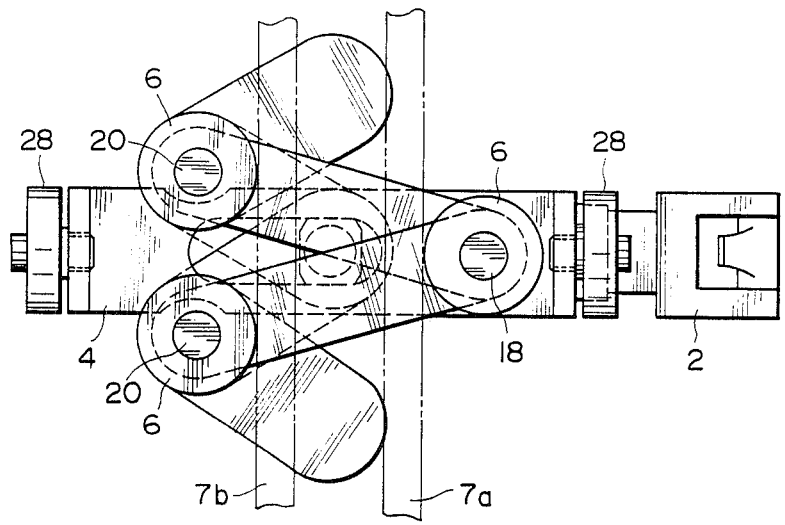
FIG. 8 is a plan view of another variation of a link device according to the present invention.
Figure 9:
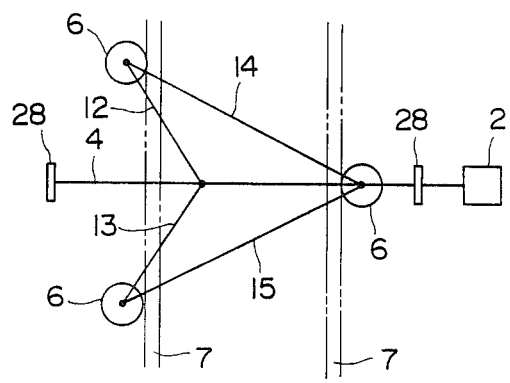
FIG. 9 is a plan view of a model of the link device illustrated in FIG. 8.

In an example illustrated in FIGS. 8 and 9, unlike in FIG. 6, the guide-rollers 6 are provided at the junction 18 of long links 14 and 15, at the junction 20 of long link 14 and short link 12 and at the junction 20 of long link 15 and short link 13.

Such an arrangement of the guide-rollers 6, unlike the arrangement in FIG. 6, is triangular and therefore the engagement of the guide-rollers 6 with the guide-rails 7 becomes more stable and as a consequence the folding movement of the link member unit 3 becomes more stable.

Figure 10:
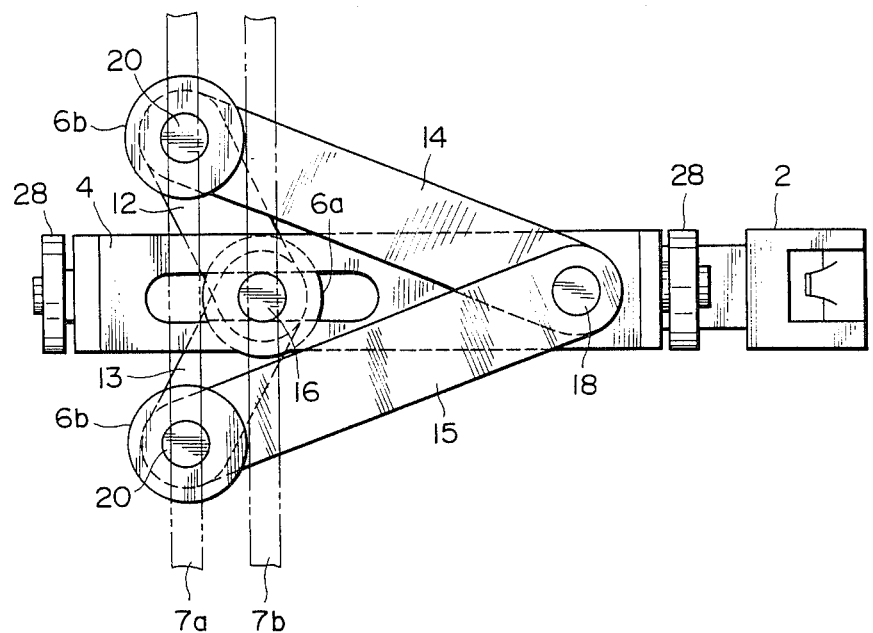
FIG. 10 is a plan view of still another variation of a link device according to the present invention.
Figure 11:
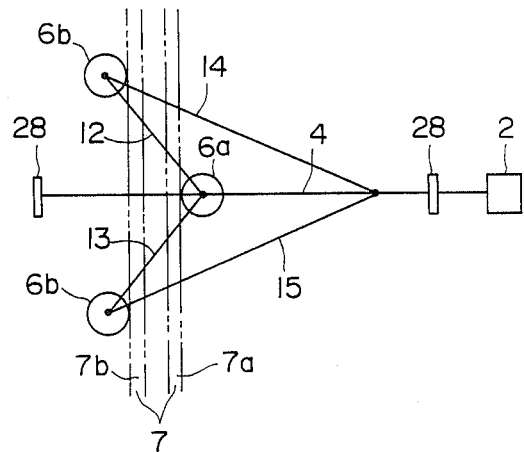
FIG. 11 is a plan view of a model of the link device illustrated in FIG. 10.

In the example illustrated in FIGS. 10 and 11, the sub-link 4 lies over the junction 18 of long links 14 and 15 and the junction 16 of short links 12 and 13. A guide-roller 6 is provided each at the junction 16, at the junction 20 of long link 14 and short link 12 and at the junction 20 of long link 15 and short link 13. The guide-roller 6a at the junction 16 and the guide-rollers 6b at the junction 20 are vertically staggered in position. Thus, in FIG. 10, the guide-roller 6a is disposed below the link member unit 3, while the guide-rollers 6b are disposed above the unit 3. Accordingly, the guide-rail 7a engages with the guide-roller 6a below the unit 3, while the guide-rail 7b engages with the guide-rollers 6b above unit 3. In this example, the long links 14, 15 and the short links 12, 13 are not arranged with the vertically symmetric formation illustrated in FIG. 3.

In the above arrangement when ajusting the gauge of the guide-rails, an interference between the guide-rails 7a and 7b can be avoided through vertical staggering of the guide-rollers 6a, 6b and of the guide-rails 7a, 7b. In this way, the numbers of the guide-rollers 6, the guide-rails 7 and the link members can be decreased. Since the guide-rollers 6a and 6b are vertically staggered, the moment on the link member unit 3 in a vertical plane when the guide-rails 7a and 7b are clipped by guide-rollers 6a and 6b, can be countered by plates for preventing floating of the rollers 28.

Figure 12:
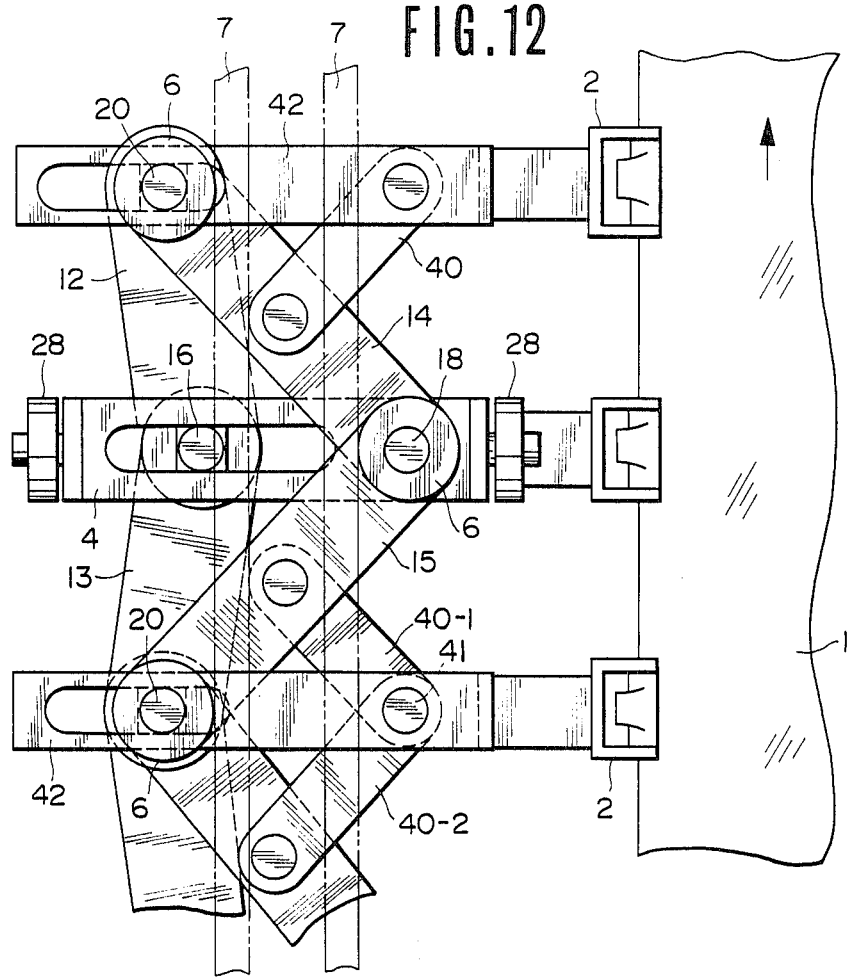
FIG. 12 is a plan view of one embodiment of the present invention with intermediate link units added to the link device.
Figure 13:
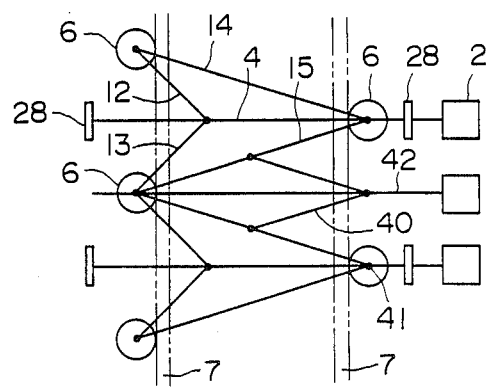
FIG. 13 is a plan view of a model of the link device illustrated in FIG. 12.

In the example of FIGS. 12 and 13, an intermediate link unit is added, and a pair of intermediate links 40-1, 40-2 which are rotatably connected to each other are connected to the adjacent long links 14 and 15 of two adjacent link member units 3. In addition to the sub-link 4 provided above the link member unit 3, there is provided between sub-links 4, 4, an intermediate sub-link 42 lying over the junction 20 of the long link and short link and over the junction 41 of the link members 40-1 and 40-2 of the intermediate links 40. The guide-rollers 6 are provided at the junction 18 of long links 14 and 15 and at the junction 20 of long links 14, 15 and short links 12, 13.

In such an arrangement, the pitch between the grippers 2 is shorter by introducing the intermediate sub-links 42. At the time of stretching a sheet material, particularly non-oriented film, a transverse necking may occur in non-gripped edges of both sides of the film between grippers which often causes a problem in production and a deterioration in the quality of the product. In such a case, it is desirable that the pitch of the grippers 2 be made shorter and in this example just this effect can be obtained. Besides, the number of guide-rollers 6 can be substantially decreased as compared with the numbers of sub-links 4, 42 and grippers 2. As a result, the running resistance of the guide-rollers against the guide-rail 7 can be decreased and then the force required for driving the endless chain 5 can be decreased.

For the purpose of obtaining a higher running speed, the guide-rail 7 has to be made thicker for increasing rigidity and as a consequence an increase in the length of the link member is inevitable. However, the addition of the intermediate link 40 will guarantee the rigidity of the link member unit 3, while the presence of the intermediate sub-link 42 will keep the pitch between grippers 2 short. Thus, a high running speed can be realized with the rigidity of every part secured.

Figure 14:
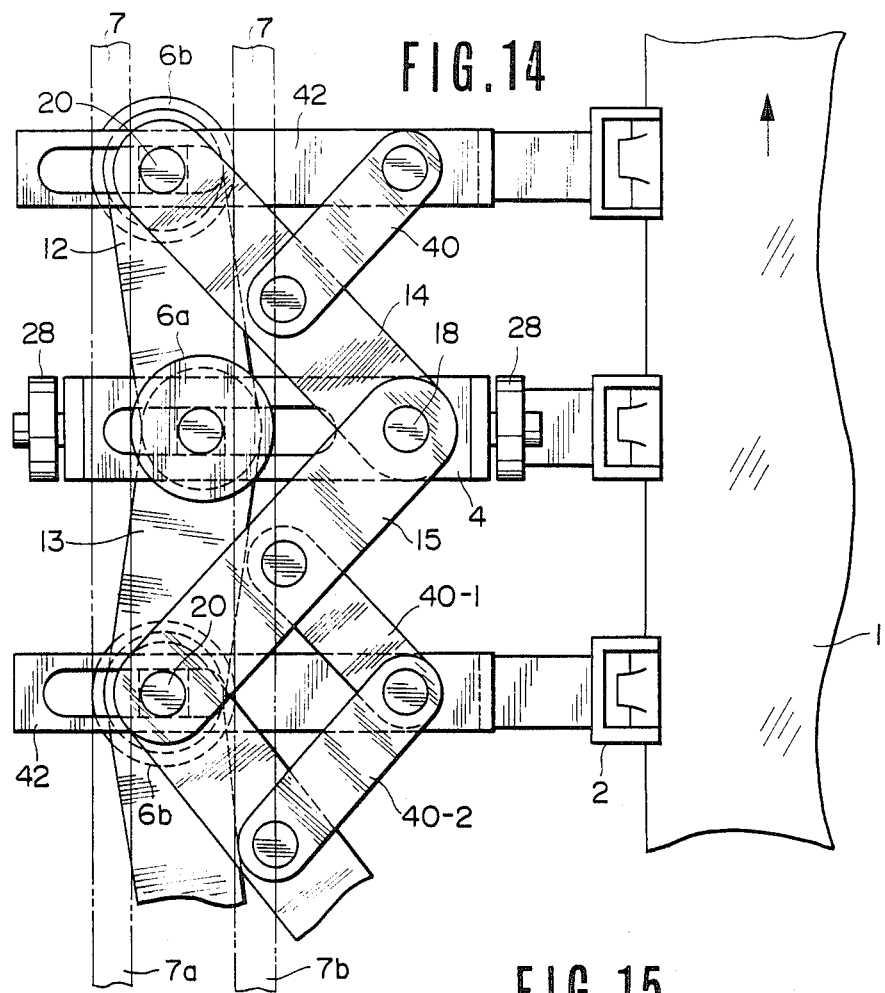
FIG. 14 is a plan view of another embodiment of the present invention with intermediate link units added to the link device.
Figure 15:
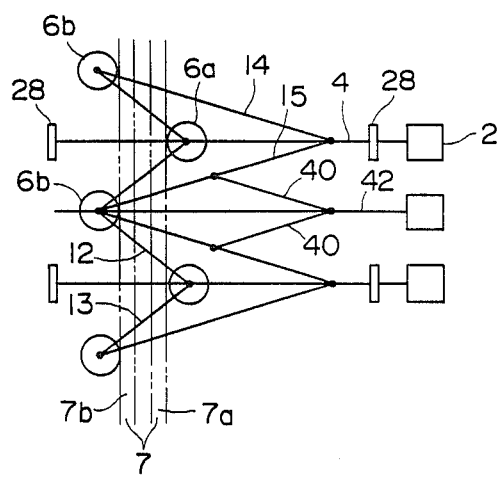
FIG. 15 is a plan view of a model of the link device in FIG. 14.

FIGS. 14 and 15 illustrate another example of adding an intermediate link. In this example, the intermediate links 40 are added to the arrangement of FIGS. 10 and 11. Namely, there are provided the intermediate link 40 and the intermediate sub-link 42, while the guide-rollers 6a and 6b are vertically staggered in position.

In this arrangement, the intermediate link 40 serves to guarantee the rigidity of the link member unit 3, while the intermediate sub-link 42 keeps the pitch between grippers 2 short. At the same time, the numbers of guide-rollers 6, guide-rails 7 and link members can be reduced as compared with their numbers in the example of FIGS. 12 and 13.

Next the fitting position of the gripper 2 will be explained.

Figure 16:
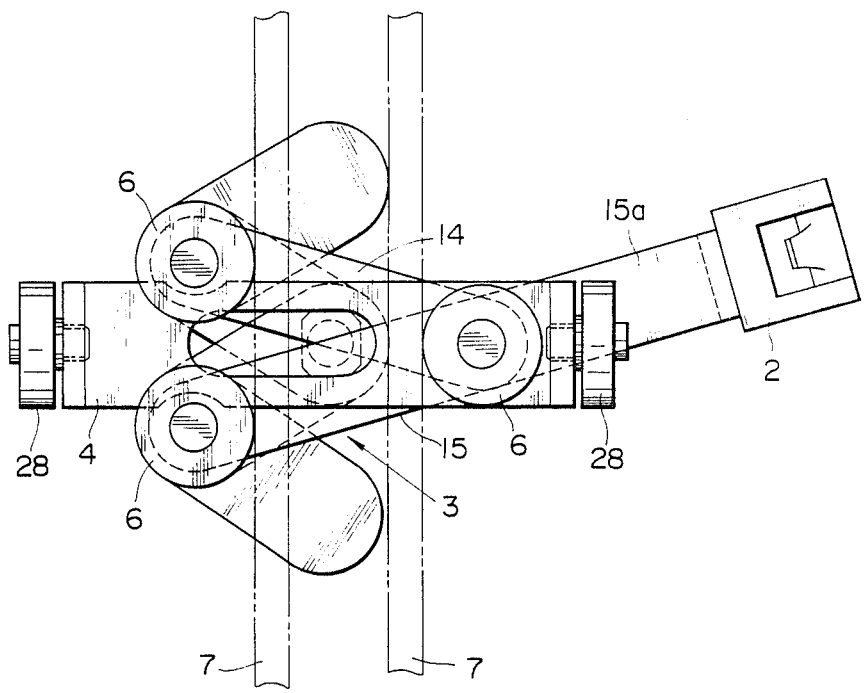
FIG. 16 is a plan view of one embodiment of the present invention with a gripper attached to the link member unit.

In all of the above examples, the gripper 2 is attached to the sub-link 4 or the intermediate sub-link 42. As illustrated in FIG. 16, however, the gripper 2 may be fitted to the link member unit 3. In the example of FIG. 16, the gripper 2 is fitted to the end of the extended portion 15a of one long link 15. The direction of the gripper 2 fitted to the long link 15 will change depending on the folding movement of the link member unit 3. For a sheet material whose stretching is virtually unaffected by change of the direction of the gripper 2, application of such an arrangement will be allowed. In the present example, if the sub-link 4 is a laterally extending U-shaped member, an interference will occur between the extended portion 15a and the sub-link 4 and to prevent the interference the affected part of the sub-link 4 is split into upper and lower members.

Next, the connection system of the sub-link 4 will be explained.

In all of the above examples, the connection of the sub-link 4 on the side of long links 14, 15 is constructed such that only rotational movement is allowed, while the connection on the opposite side is made slidable in a long slot 24. The connection system is not limited to this embodiment, namely it is possible to make the connection on the side of long links 14, 15 slidable and to make the connection on the opposite side rotatable. In the latter case, the stretch tension transmitted from the gripper 2 will be given to the link member unit 3 via the rotatable connection on the opposite side to the gripper 2. As a result, the stretch tension will be more likely to be borne by the guide-roller 6 and the guide-rail 7 on the opposite side to the gripper 2, and this will bring about the advantage of realizing stable stretching.

Next, the arrangement of the rollers 28 will be explained.

As illustrated in FIGS. 12 and 14, the roller 28, depending on the condition, does not have to be provided at every sub-link. For instance, according to the force acting on each roller 28, the rollers 28 may be arranged at an interval of every other sub-link 4 or at a longer interval.

Figure 17:
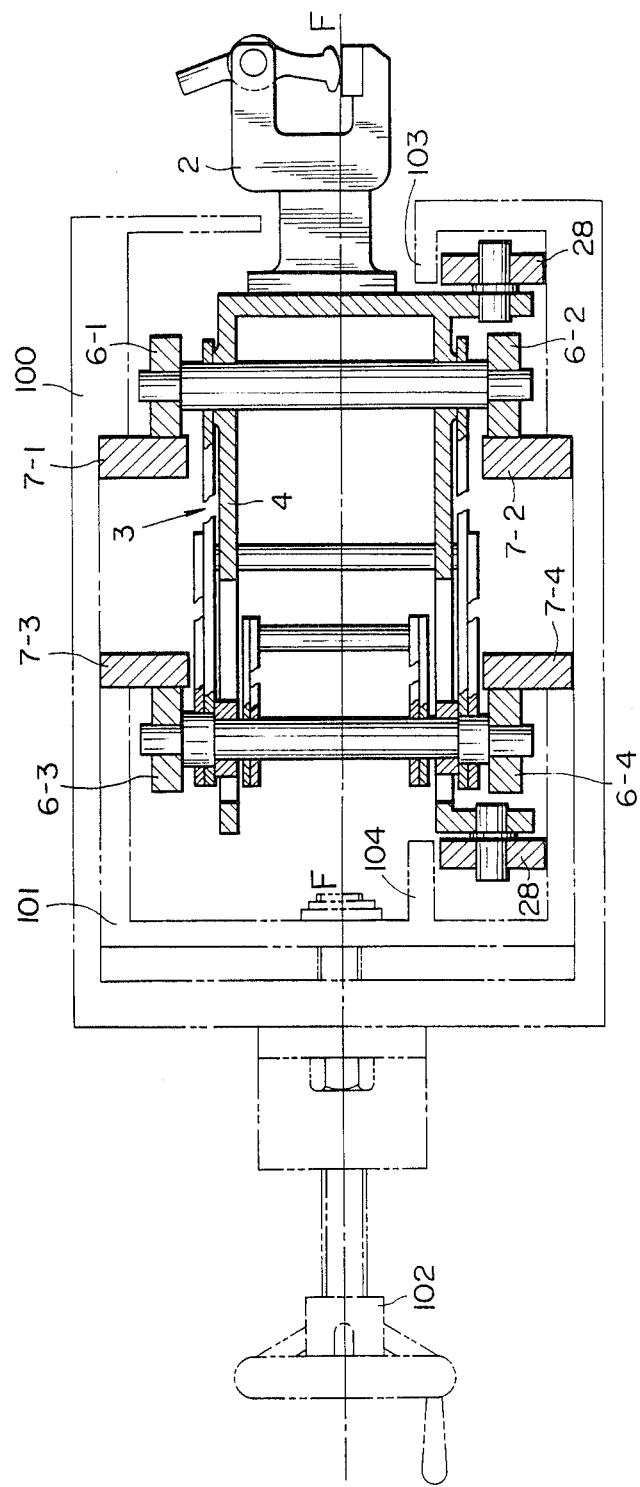
FIG. 17 is a vertical sectional view of the link device wherein the rollers are provided only at the lower part of the sub-link.

FIG. 3 is an example of rollers 28 being arranged in vertical symmetry. As shown in FIG. 17, however, the rollers 28 may be provided only below the sub-link 4. In that case, it would be desirable to provide the roller stoppers 103, 104 extending over the rollers 28. Then the vertical movement of the rollers 28 would be constrained and dancing of the link member unit 3 in running as well as its rotational movement under action of a moment would be prevented. Thus, even if the rollers 28 exist only below the sub-link 4, a smooth running with a low resistance will be guaranteed.

Next, a typical pattern of stretching in the stretching apparatus according to the present invention will now be illustrated.

Figure 18:
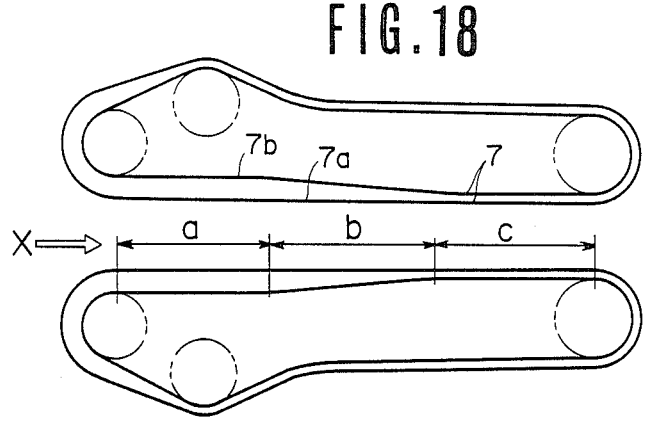
FIG. 18 is a plan view of an example of a guide-rail arrangement where the sheet material is to be stretched only in the longitudinal direction.
Figure 19:
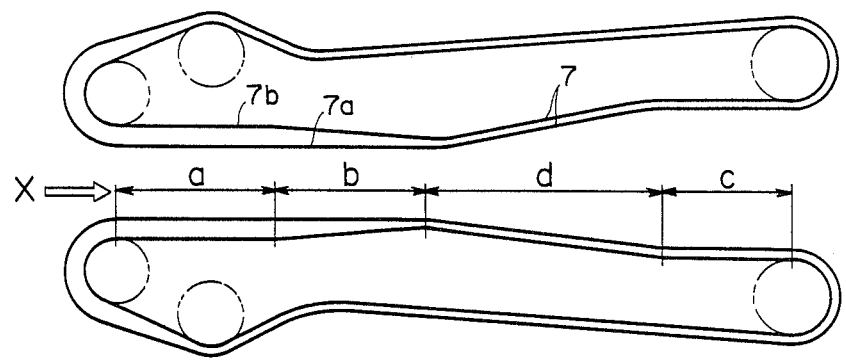
FIG. 19 is a plan view of an example of a guide-rail arrangement where the sheet material is to be stretched in the longitudinal direction and then in the transverse direction.
Figure 20:
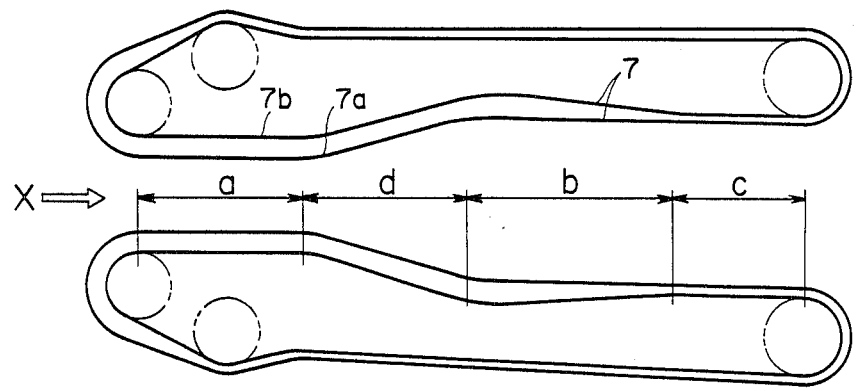
FIG. 20 is a plan view of an example of a guide-rail arrangement where the sheet material is to be stretched in the transverse direction and then in the longitudinal direction.

FIG. 1 shows an example where the sheet material 1 is biaxially stretched at the same time. FIGS. 18, 19 and 20 show examples of a guide-rail arrangement for other typical patterns of stretching.

FIG. 18 is a case of the sheet material being stretched only in the longitudinal direction. In this case, a pair of guide-rails 7 provided on both transverse sides of the sheet material are arranged parallel to the running direction X of the sheet material. The gauge between the guide-rails 7a and 7b in the pair of guide-rails 7 is adjusted to be parallel in section a, is gradually made narrower in section b and is again parallel in section c. Therefore, in section b the angle of folding of the link member unit 3 gradually changes, the pitch of grippers 2 gradually increases and thus the sheet material is stretched in the longitudinal direction. The section a is a pre-heating zone and the section c is a heatset zone or a cooling zone.

In this way, the stretching apparatus according to the present invention is available as a longitudinal stretching machine for stretching the sheet material in the longitudinal direction alone. Usually for the purpose of improving the surface property of the sheet material such as a film, the surface of material is subjected to coating or laminating with another film. A typical system for longitudinal stretching is a multi-roll system utilizing the peripheral speed difference between rolls. When the coat or the composite layer is composed of a low-melting point material, the low-melting point material in contact with the surface of the rolls which can also pre-heat the sheet material becomes melted and sticks to the rolls, thereby resulting in failing to be stretched. In the system illustrated in FIG. 18 which can perform non-contact heating of the material, there is no sticking problem as exists in the roll system and, accordingly, it is possible to make a longitudinal stretching of the sheet material coated with a low-melting point material, unlike in the roll system.

FIG. 19 is an example of stretching a sheet material in the longitudinal direction and then in the transverse direction. In this case, a pair of guide-rails 7 disposed on both sides of the sheet material in the transverse direction are arranged parallel to the running direction X of the material in sections a and b, but in section d these rails are gradually spread out, and again in section c they become parallel. The gauge between the guide-rails 7a and 7b is adjusted to be gradually narrower in section b and to be parallel in sections a, d and c. Thus, the sheet material is preheated in section a, stretched in the longitudinal direction in section b, stretched in the transverse direction in section d and heat-set or cooled in section c. In the conventional biaxial successive stretching system for stretching the sheet material in the longitudinal direction and then in the transverse direction, separate stretching machines units are usually arranged in series. According to the present invention, as seen in FIG. 19, biaxial successive stretching can be performed easily within a single device.

FIG. 20 is an example of stretching the sheet material in the transverse direction and then in the longitudinal direction. A pair of guide-rails 7 are, in section a, arranged parallel to the running direction X of the sheet material, spread out in section d, and parallel again in sections b and c. The gauge between the guide-rails 7a and 7b is adjusted to be gradually narrower in section b and parallel in the other sections a, d and c. Thus, the sheet material is preheated in section a, stretched in the transverse direction in section d, stretched in the longitudinal direction in section b and thermoset or cooled in section c. Thus, unlike in FIG. 19, the procedure for stretching in the longitudinal and transverse directions can be reversed.

FIGS. 1, 18, 19 and 20 illustrate typical stretching patterns, but the present invention is not limited to these patterns. For instance, when longitudinal stretching after biaxial stretching is demanded to improve the mechanical properties in the longitudinal direction in the recent needs of a film as a video and audio tape, the demand can be easily satisfied by adjusting the gauge between the guide-rails 7a and 7b gradually narrow in section c in FIGS. 19 and 20. It is apparent that the present invention can also satisfy the demand, when transverse stretching after biaxial stretching is required. Further the present invention could realize a two-step stretching such as additional longitudinal stretching after longitudinal stretching or additional transverse stretching after transverse stretching. Thus the present invention can be adapted to whatever stretching sequence is required from production needs.

Figure 21:
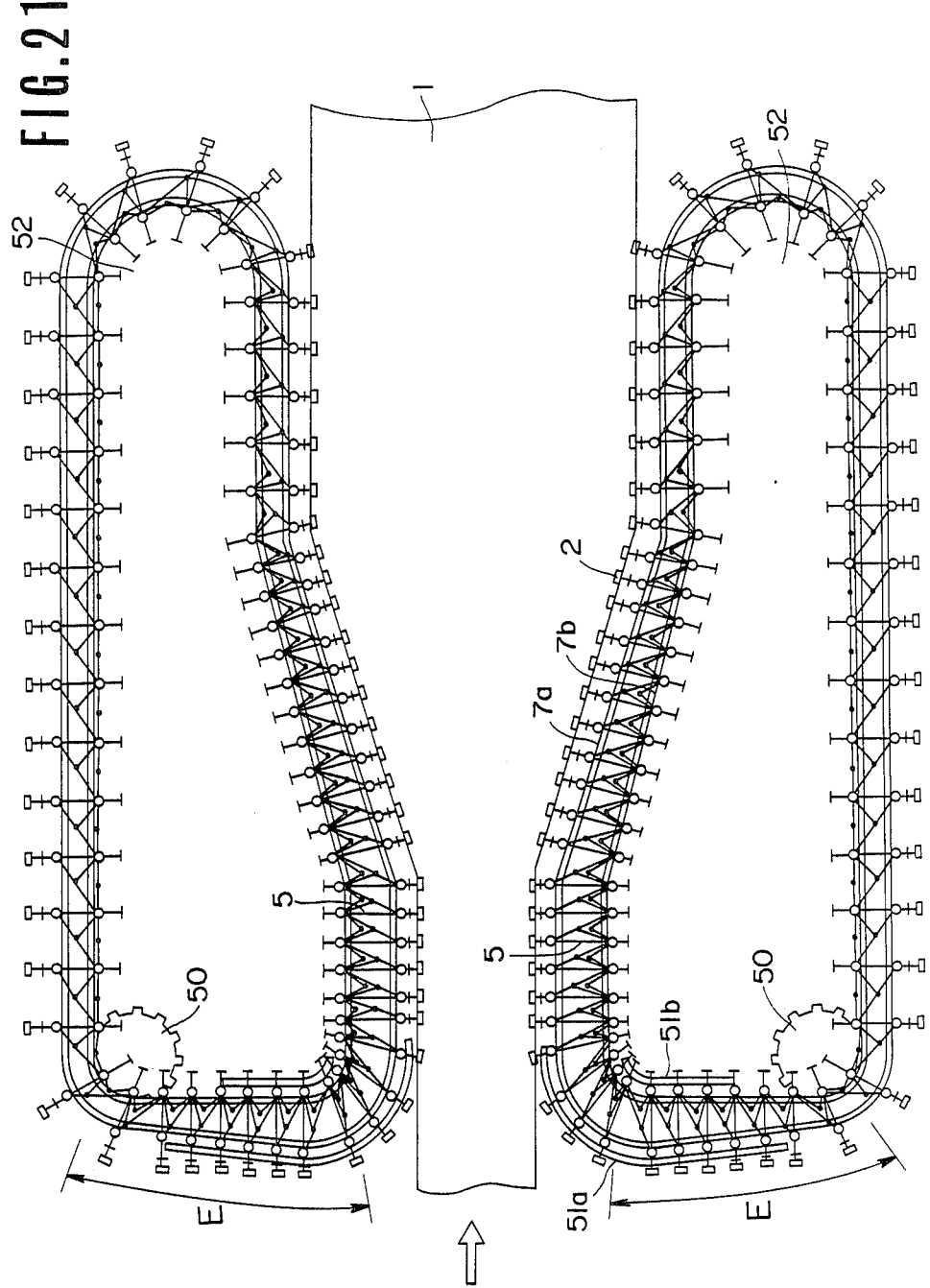
FIG. 21 is a schematic plan view of a stretching device having only one sprocket for driving each of endless chains provided at both sides of the sheet material.

FIG. 21 illustrates a different embodiment of the drive mechanism for the endless chain link 5 from that shown in FIG. 1. In this embodiment, there is one drive sprocket 50 for engaging each endless chain 5. The drive sprocket 50 is located at the position where the decreasing pitch section E begins. In this section E, the gauge between the guide-rails 7a and 7b is gradually increased, while the pitch of grippers 2 is gradually decreased. In this section E, the guide-rails 51a, 51b to guide the guide-rollers 6 are provided as well as the guide-rails 7a and 7b.

According to the present invention, in which the provision of rollers 28 at sub-link 4 results in reducing the total running resistance of the endless chain 5, each endless chain 5 can be easily driven by only one drive sprocket 50. When the stretching machine is small and the load is light, the drive sprocket 50 may be located at the exit 52. In that case, the link member unit 3 will be pulled in the running direction on the decreasing pitch section E and therefore the guide-rails 51a, 51b can be removed. If necessary, in addition to the drive sprocket 50, an auxiliary sprocket may be provided at each turning point of the endless chain 5.

Next, the intersecting angle between short links in the decreasing pitch section will be described. To reduce the running resistance of the endless chain 5, it is desirable as shown in FIG. 1 that the resistance between the rollers 6 and the guide-rail 7 be made small by expanding the short links 12, 13 to the limit in section D of the return side. For this reason, however, the short links 12, 13 have to be folded on the reduced pitch section E so that the pitch of grippers 2 may be decreased.

Figure 22:
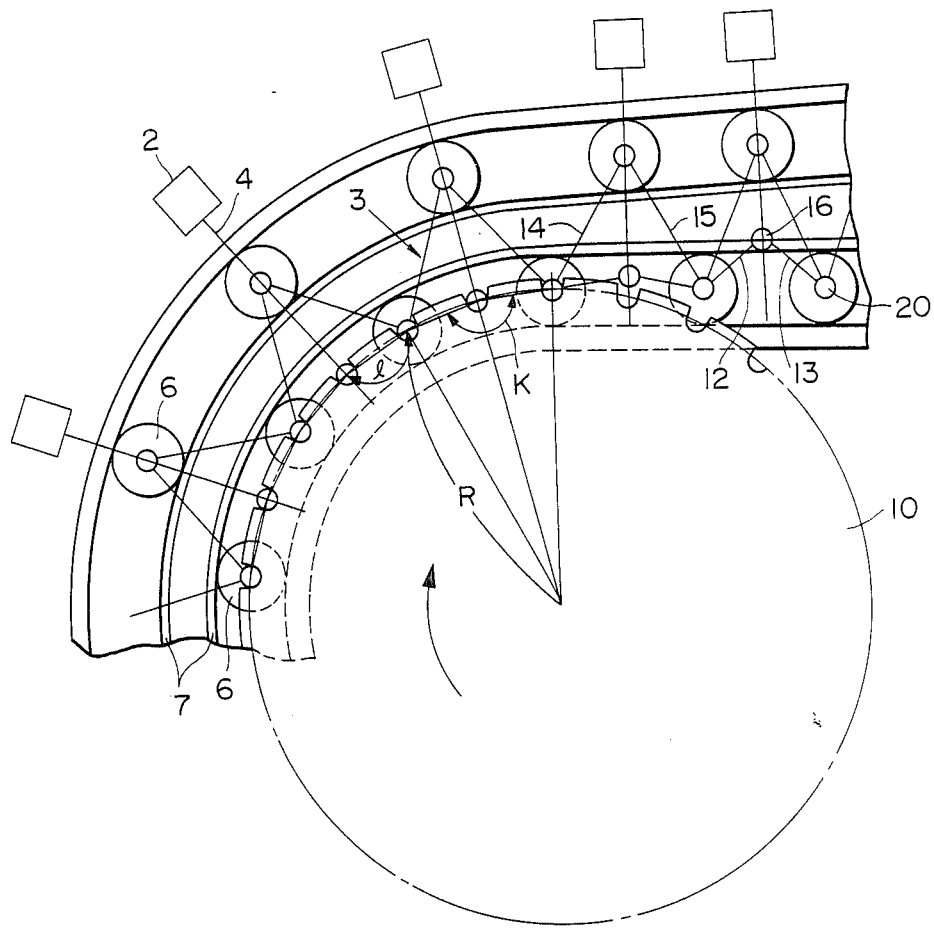
FIG. 22 is a plan view showing the vicinity of the position where a decreasing pitch section begins.

Since the short links 12, 13 expanded to the limit will be an obstruction, an infinite amount of force is required to fold the short links 12, 13 by engaging of the guide-rollers 6 with the guide-rail 7. For this reason, it is arranged as in FIG. 1 that a sprocket 10 is provided at the position where the decreasing pitch section E begins, and, after the intersecting angle between the short links 12, 13 is made less than 180° by engaging with the sprocket 10, the pitch of the grippers is decreased. Thus as indicated in FIG. 22, the intersecting angle K between the short links 12 and 13 can be obtained by making the link member junctions 16, 20 engage the sprocket 10. The angle K thus set is determined by $K = 2 \times \cos^{-1}(1/2R)$, where R is the radius of pitch circle of the sprocket 10, and 1 is the length of short links 12, 13. In order to obtain the smaller intersection angle K for the purpose of facilitating the reduction of the pitch of grippers 2 in the decreasing pitch section E, the method available will be to make the value of 1 larger or the value of R smaller in the above formula. There is, however, a limitation to the increase in the value of 1, because an increased 1 will mean an increased pitch of grippers 2, and resulting in necking and uneven stretching of the sheet material.

On the contrary, decreasing the radius of the sprocket 10 will mean increasing the unsteadiness of acceleration due to the rotational radius of the link device about the center of the sprocket being small and thereby smooth running at high speed can not be expected. In addition, the heavy abrasion of the rollers 28 caused by the unsteadiness of the acceleration of the rollers 28 which supports the link device makes the amount of maintenance troublesome and the high speed running very difficult.

Some examples of making the intersecting angle K between short links small without increasing the length of the short links 12, 13 and decreasing the radius of the sprocket 10 will be illustrated below.

Figure 23:
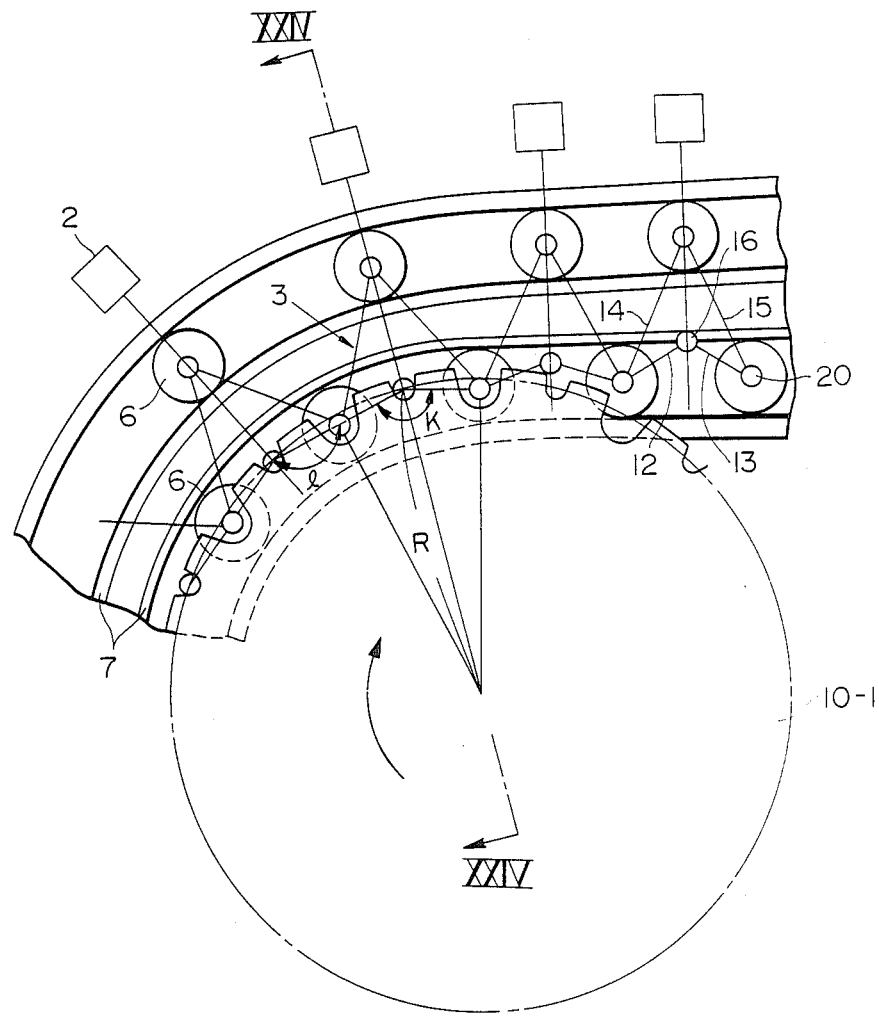
FIG. 23 is a plan view showing an example of the means for providing a small intersecting angle between a short link and a short link at the position where a decreasing pitch section begins.
Figure 24:
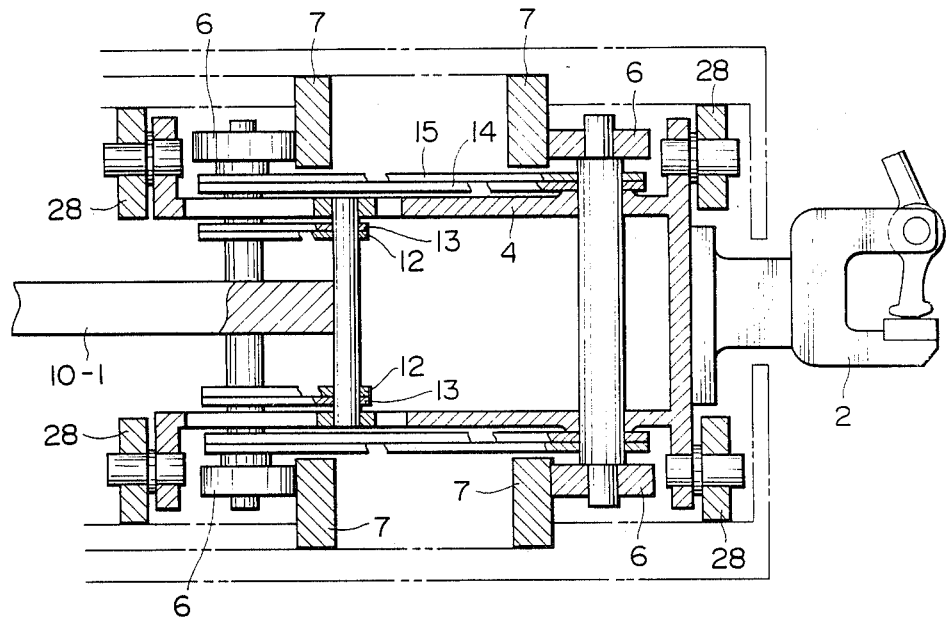
FIG. 24 is a vertical sectional view taken along XXIV—XXIV of FIG. 23.

In the example shown in FIG. 23, the sprocket 10-1 provided at the position where the reduced pitch section E following the longest gripper pitch section D begins, engages with every junction 16 of the link member unit 3. Namely, the sprocket 10-1 does not mesh with the junction 20 of short links 12, 13 and long links 14, 15 but with the junction 16 of short link 12 and short link 13. As indicated in FIG. 24, the sprocket 10-1 engages with the link member unit 3 at the midway of the link member unit 3 in the vertical direction thereof.

As illustrated in FIG. 23, the short link 12 and the short link 13 of the adjacent link member units 3 are forcibly positioned in a straight row while the sprocket 10 meshes with the link member unit. Thus, the intersecting angle K between the short link 12 and the short link 13 in the link member units 3 is determined by the formula $K = 2 \times \cos^{-1}(1/R)$.

According to the above formula for this arrangement, sprocket 10-1 with the radius two times the radius of the sprocket in the case of FIG. 22 can be employed to get the same value of K as obtained in the case of FIG. 22. Since the value of K can be made small with the radius of sprocket kept larger than the necessary value, the reduction of the pitch of grippers can be easily accomplished at the same time with the attainment of high-speed performance.

Figure 25:
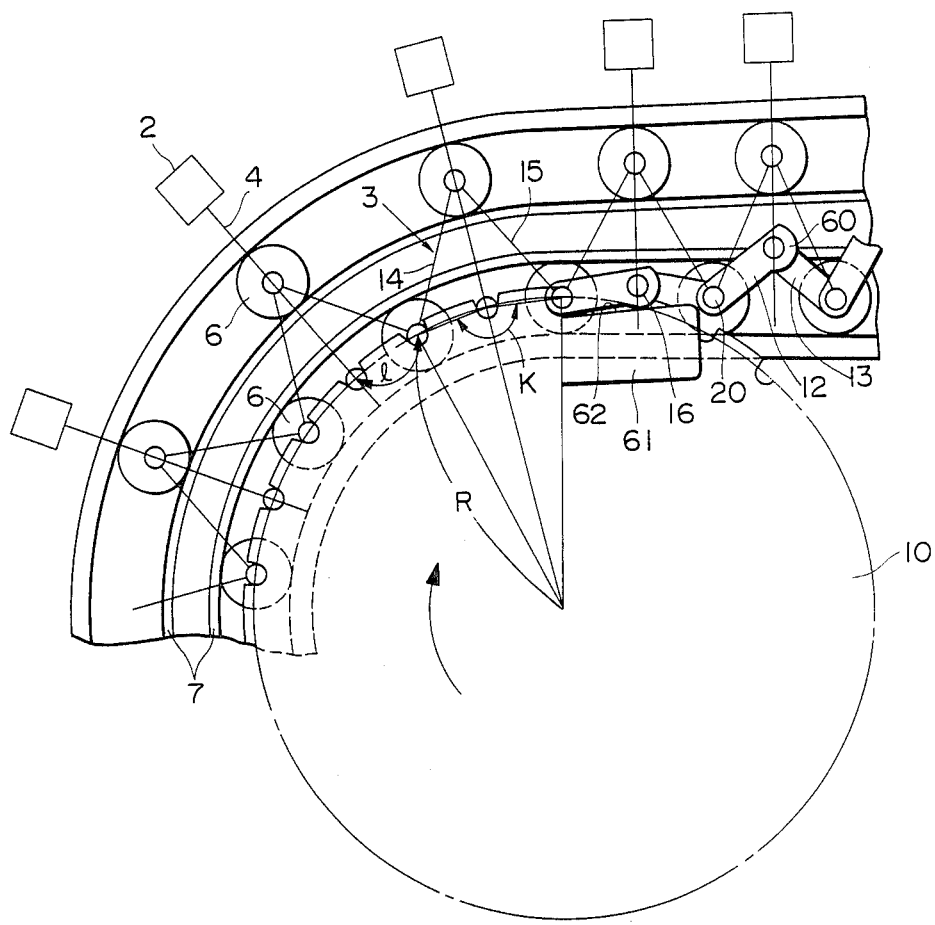
FIG. 25 is a plan view showing another example of a means for providing a small intersecting angle of a short link with a short link at the position where a decreasing pitch section begins.

In the example of FIG. 25, the short link has a prominent portion 60 protruding in the opposite direction to the side of long links 14, 15, and at the position where the decreasing pitch section E begins, a guide plate 61 is provided. The guide plate 61 engages with the prominent portion 60 and moves the junction 16 of short links 12 and 13 to the side of long links 14, 15.

In this example, wherein the engaging face 62 of the guide plate 61 is linearly inclined as shown in FIG. 25, the prominent portion 60 can smoothly slide on the face 62. At the end of the face 62, the angle K between short links 12, 13 is forcibly reduced to a desired value and thus the subsequent reduction of the pitch of grippers 2 is facilitated. The face 62 may be non-linear, or smoothly curvilinear.

Figure 26:
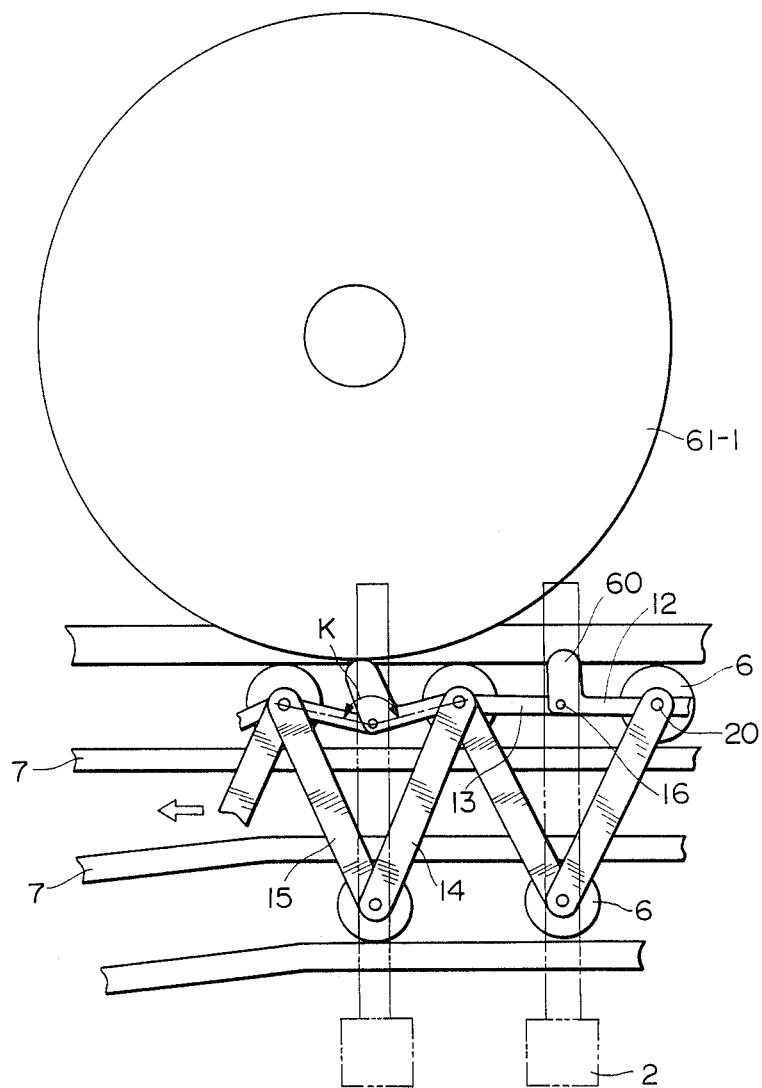
FIG. 26 is a plan view of a variation of the means illustrated in FIG. 25.

If the guide plate 61 in FIG. 25 is a rotatable disk 61-1 in FIG. 26, the relative slipping between the rotatable disk 61-1 and the prominent portion 60 will become very small, assuring a smoother engagement. The engaging piece 61 or the rotatable disk 61-1 may be located at any position in the decreasing pitch section E. The guide plate 61 or the rotatable disk 61-1 is desirably designed so that the angle K becomes less than 170° to facilitate the subsequent reduction of pitch of grippers 2.

Figure 27:
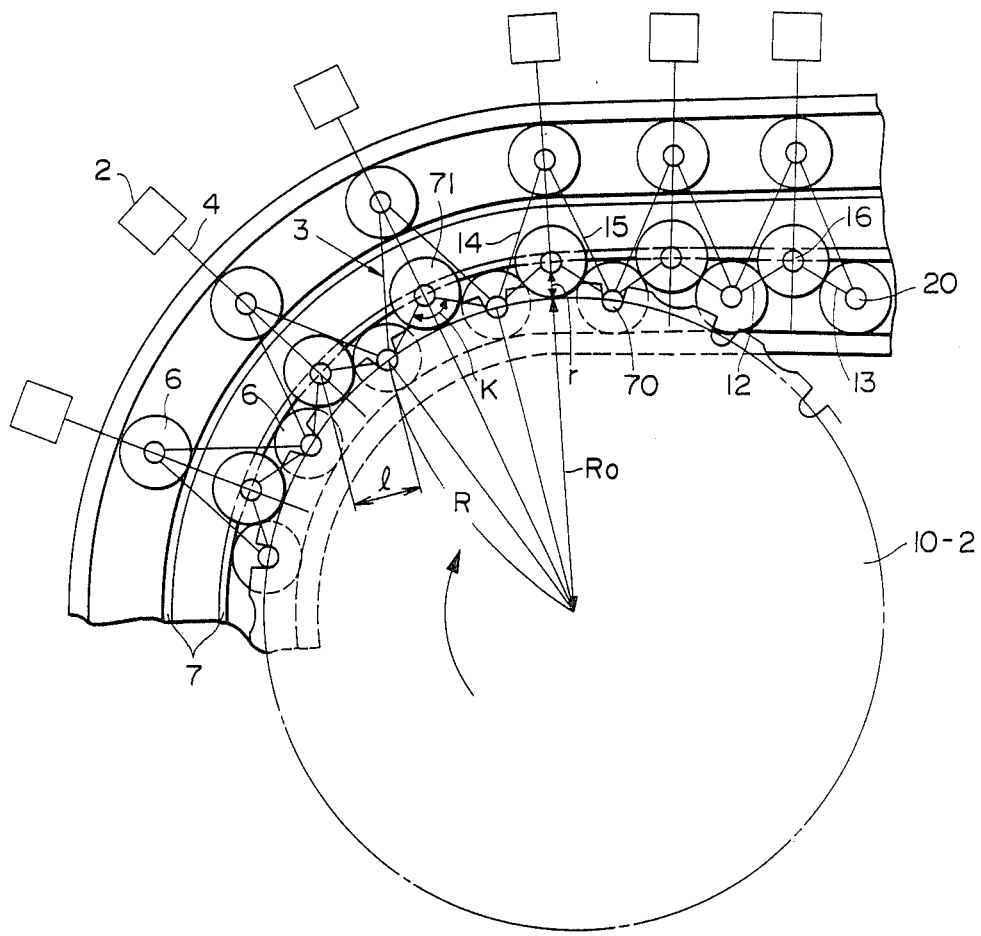
FIG. 27 is a plan view of still another example of the means for providing a small intersecting angle of a short link with a short link at the position where a decreasing pitch section begins.

In the example of FIG. 27, at the junction 16 of short links 12 and 13, there is provided an engaging piece 71 which engages with the sprocket 10-2 and has a larger radius than that of the engaging piece 70 provided at the junction which connects the adjacent link member units 3.

In this example, the distance between the center of sprocket and the junction 16 becomes $R_O + r$, where $R_O$ is the root circle radius on the tooth surface of the sprocket 10-2 which engages with the engaging piece 71 and r is the radius of the engaging piece 71.

In contrast, the distance between the center of the sprocket and the junction 20 is equal to R, i.e. the pitch circle radius of the sprocket 10-2. Accordingly, the angle K becomes small according to the amount of $R_O + r - R$ which represents the distance between the junction 16 and junction 20 in the radial direction. As a consequence, even after the sprocket 10-2 releases the link member unit 3, the pitch of grippers 2 is easily decreased, and high-speed running can be obtained by making the radius of the sprocket large.

Figure 28:
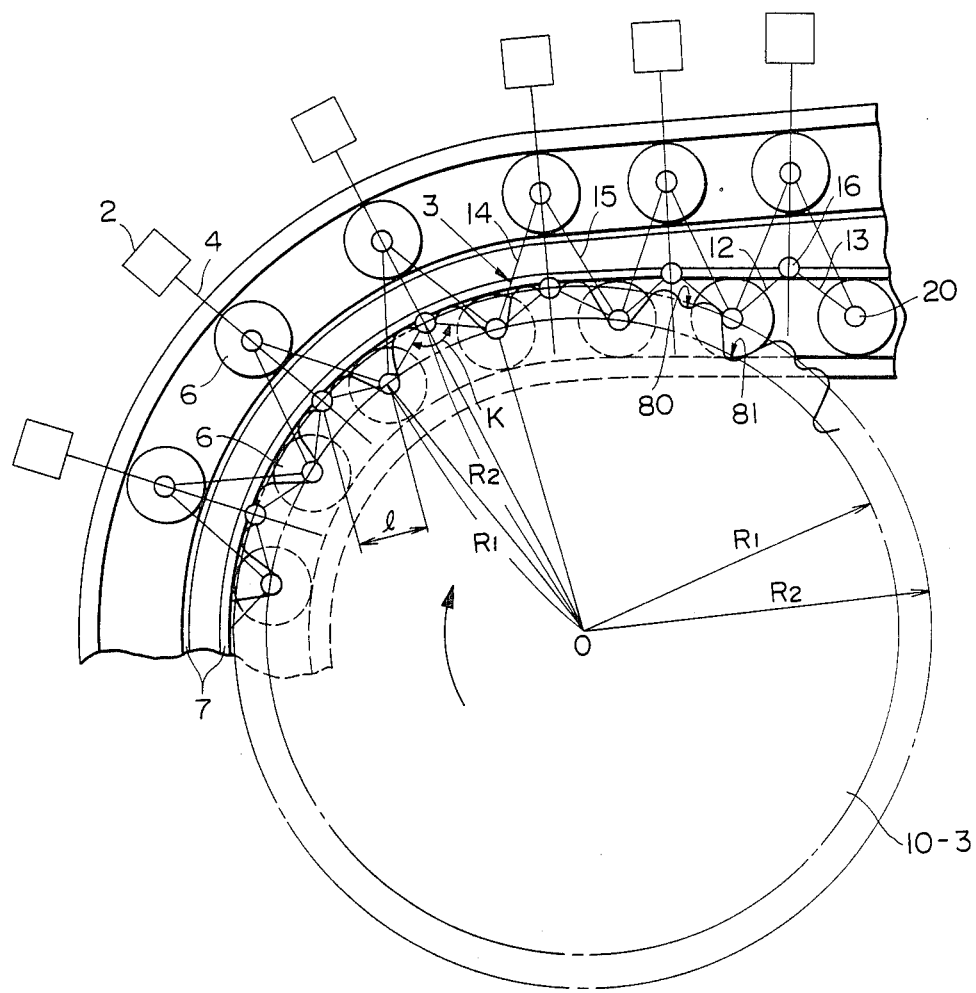
FIG. 28 is a plan view of still another example of the means for providing a small intersecting angle of a short link with a short link at the position where a decreasing pitch section begins.

In the example of FIG. 28, the pitch circle radius on the tooth surface of the sprocket 10-3 is made alternately large and small. Thus, the pitch circle diameter $R_2$ on the tooth surface 80 which engages with the junction 16 to connect short link 12 and short link 13 is made larger than the pitch circle radius $R_1$ on the tooth surface 81 which engages with the junction 20 connecting the adjacent link member units 3.

In this example, the angle K between short links 12 and 13 is given by $K = 2\cos^{-1}((1^2 + R_2^2 - R_1^2)/(2R_2 \times 1))$. When $R_1 = R_2$, the state of FIG. 22 is generated. The larger the value of $R_2/R_1$ is, the smaller will be the angle K. Therefore when $R_2/R_1$ is appropriately set, a desired value of K will be obtained, thereby facilitating decreasing of the pitch of grippers 2.

Figure 29:
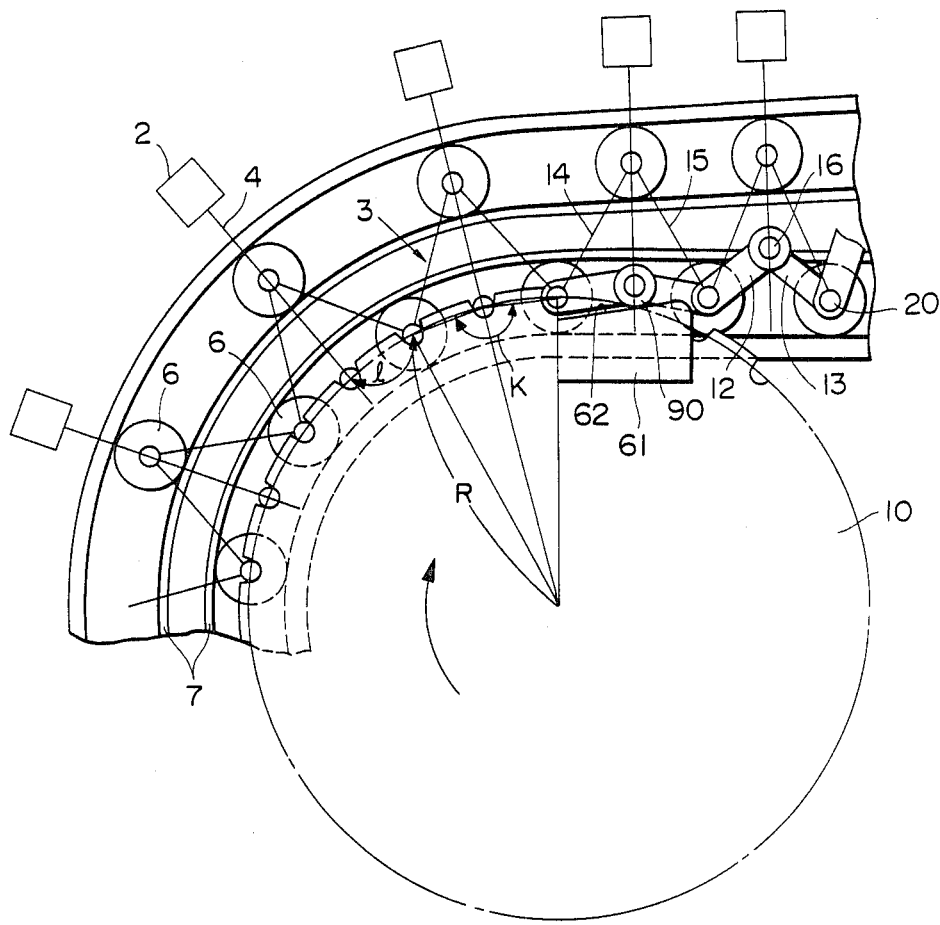
FIG. 29 is a plan view of still another example of a means for providing a small intersecting angle of a short link with a short link at the position where a decreasing pitch section begins.

In the example of FIG. 29, a ring 90 is provided at the junction 16 of short link 12 and short link 13, while at the position where the decreasing pitch section E begins a guide-plate 61 which engages with ring 90 and shifts the junction 16 to the side of long links 14, 15 is provided.

In this example, the ring 90 moves along the guide surface 62 of the guide-plate 61 and at the end of the guide surface 62, the angle K between short link 12 and short link 13 is forcibly reduced to a required value.

As a result, the subsequent reduction of the pitch of the grippers is facilitated.

If the ring 90 is rotatably held, a smoother reduction of the angle K will be possible. And if the guide surface 62 is curvilinear, a smoother engagement will be possible. As the guide-plate 61, a rotatable disk may be employed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A link device for stretching a sheet of material, said link device being capable of moving in a running direction and comprising:
   a plurality of pantograph-like link member units coupled to each other in series in the running direction, each of said units being pivotally connected via a first connection pin to one adjacent unit and being pivotally connected via a first connection pin of another adjacent unit to said another adjacent unit in said running direction, each of said units being constructed of a plurality of link members including first and second long links and first and second short links pivoted in a pantograph manner, each of said link members having first and second ends, said first ends of said first long and short links being pivotally mounted about said first connection pin, said first ends of said second long and short links being pivotally mounted about said first connection pin of another adjacent unit, said second ends of said first and second short links being pivotably mounted about a second connection pin, said second ends of said first and second long links being located distally from one another, the second end of said first long link being pivotally connected via a third connection pin to a portion of the second long link;
   a plurality of sub-links, each of said sub-links being provided for each of said link member units, each of said sub-links having a longitudinal axis extending substantially perpendicular to said running direction, each of said sub-links having an elongated slot through which said first connection pin is mounted said elongated slot permitting said first connection pin to reciprocate in a direction perpendicular to said running direction, each of said sub-links and said second end of said second long link being pivotally mounted about a fourth connection pin;
   a line of support rollers supporting said link member units via said sub-links, said support rollers being rotatably mounted on fixed parts of preselected ones of said sub-links, each of said support rollers rotating about an axis substantially parallel to the longitudinal axis of said sub-link as said link device moves in said running direction, said support rollers supporting the weight of said link member units via said sub-links;
   a plurality of grippers attached to preselected ones of said sub-links for gripping a side edge of the sheet material to be stretched; and
   lines of guide rollers, said guide rollers being rotatively mounted on fixed parts of preselected ones of said link member units, said guide rollers being reciprocable in a direction perpendicular to the running direction, reciprocation of said guide rollers in said perpendicular direction causing said first connection pin to reciprocate in said direction perpendicular to said running direction, said reciprocation causing grippers to move toward or away from one another, whereby when said grippers holding said sheet material move away from adjacent grippers, said sheet material is longitudinally stretched.

2. The link device of claim 1, wherein said support rollers are provided to project only below said sub-link.

3. The link device of claim 1, wherein each guide-roller has an axis of rotation perpendicular to the running direction of the sub-link.

4. A stretching apparatus for sheet material including a pair of endless chains on both sides of said sheet material, said chains being movable in a running direction, each of said chains comprises:
   a plurality of pantograph-like link member units constructed from long links and short links having adjacent links pivoted with respect to each other, said link member units being arranged adjacently in said running direction to form said endless chain;
   a sub-link for each of said link member units, each of said long and short links of each of said link member units being pivotable attached thereto, said sub-link being positioned substantially perpendicular to said running direction;
   a pair of upper support rollers and a pair of lower support rollers rotatably mounted above and beneath each of said sub-links, respectively, said pair of lower rollers supporting said link member unit via said sub-link;
   a plurality of grippers, attached to preselected ones of said sub-links, for gripping an edge of said sheet material to be stretched;
   a pair of upper guide rollers and a pair of lower guide rollers for each of said link member units, a first one of said pair of upper guide rollers and a first one of said pair of lower guide rollers being rotatably attached to said sub-link via a first connection pin, a second one of said pair of upper guide rollers and a second one of said pair of lower guide rollers being rotatably attached to said long and short links via a second connection pin, said second connection pin vertically extending and passing through slots which are defined in said sub-link and extend perpendicularly to said running direction, said second connection pin being slidably engaged with said slots so as to move in a longitudinal direction of said slots, said second one of said upper guide rollers and said second one of said lower guide rollers being reciprocable in a direction perpendicular to said running direction through movement of said second connection pin in said slots, said reciprocation causing said long and short links of said link member unit to pivot with respect to one another; and
   guide rail means for supporting said pairs of lower support rollers and for guiding said pairs of guide rollers, said guide rail means having guide portions which contact said guide rollers along a contact face, said guide portions being located between rollers of each of said pairs of guide rollers, said contact face for said first one of said pair of upper guide rollers and said contact face for said first one of said pair of lower guide rollers being positioned form another contact face for the second one of said pair of upper rollers and the contact face for the second one of said pair of lower rollers by a predetermined distance, said predetermined distance varying in said running direction in order to cause said reciprocation of said second one of said pair of upper guide rollers and said second one of said pair of lower guide rollers and to pivot said links, said guide rail means further having a portion for restraining said upper pair of support rollers from vertical movement.

5. The stretching apparatus of claim 4, wherein said guide rail means is formed as an endless loop.

6. The stretching apparatus of claim 4, wherein said guide rail means is connected to a gauge adjuster for adjuster the predetermined distance between said contact faces depending on a desired stretching ratio of the sheet material to be stretched.

7. The stretching apparatus of claim 4, wherein a first stretching section and a second stretching section are provided, in said first stretching section said contact faces of said guide rail means are generally in parallel formation and a gauge between said contact faces is gradually decreased in the running direction of the sheet material, and in said second stretching section, the distance between said contact faces of said guide rail means is spread out in the running direction of the sheet material and a gauge between said contact faces is kept constant for stretching the sheet material in the longitudinal direction in said first stretching section and then for stretching the sheet material in the transverse direction in said second stretching section.

8. The stretching apparatus of claim 4, wherein a first stretching section and a second stretching section are provided, in said first stretching section said contact faces of said guide rail means are spread out in the running direction of the sheet material and a gauge between said pair of contact faces is kept constant, and in said second stretching section said contact faces of said guide rail means are provided in generally parallel formation and a gauge between said contact faces is gradually decreased in the running direction of the sheet material for stretching the sheet material in the transverse direction in said first stretching section and then for stretching the sheet material in the longitudinal direction in said second stretching section.

9. The stretching apparatus of claim 4, wherein a stretching section is provided in which said predetermined distance of said guide rail means varies and in which each of said endless chains move in a divergent direction relative to the other said endless chain of said pair of chains for stretching the sheet material simultaneously in both a longitudinal and transverse direction.

10. The stretching apparatus of claim 4, wherein each of the endless chains provided on both sides of the sheet material to be stretched can be driven by one drive sprocket at a start position of a deceasing pitch section where pitch of grippers is decreased by folding of the like member units of said endless chain.

11. The stretching apparatus of claim 4, wherein as sprocket which meshes with a junction of the short link and the short link of said link member units is provided, said sprocket being located at a start position of a decreasing pitch section which comes after a gripper pitch section where pitch of the grippers in the endless chain is longest.

12. The stretch apparatus of claim 4, wherein a prominent portion protruding on a side of each link member unit opposite to a side having the long links and on a side having the short links of the link member unit is provided, and further a guide plate is provided, said guide plate engages said prominent portion and moves a junction of short link and short link toward the side having long links and said guide plate being provided at a start position of a decreasing pitch section following a gripper pitch section where gripper pitch in the endless chain is longest.

13. The stretching apparatus of claim 4, wherein a first guide piece is provided at a junction of short link and short link in each of said link member units and a second guide piece is provided at a junction of short link and long link in each of said link member units, a sprocket further being provided at a start position of a decreasing pitch section following a griper pitch section where pitch of grippers of the endless chain is longest, said sprocket and first guide piece having a radius which is larger than a radius of the sprocket and second guide piece when the sprocket engages said link member unit.

14. The stretching apparatus of claim 4, wherein a sprocket is provided at a start position of a decreasing pitch section following a gripper pitch section where pitch of the grippers of the endless chain is longest, said sprocket engages the link member units and has a first tooth surface which meshes with said link member unit at a junction of short link and short link and said sprocket has a second tooth surface which meshes with said link member unit at a junction of long link and short link, said first tooth surface having a radius which is larger than a radius of said second tooth surface.

15. The stretching apparatus of claim 4, wherein a ring is provided at a junction of short link and short link in said link member unit, and a guide plate is provided at a start position of a decreasing pitch section following a gripper pitch section where gripper pitch of the endless chain is longest, said guide plate engages said ring and moves the junction of short link and short link toward a side of the link member unit having the long links.

16. The stretching apparatus of claim 4, wherein each of said guide rollers have an axis of rotation perpendicular to the running direction of the sub-link.

17. The stretching device of claim 4 wherein said guide rail means encloses said link member units, said sub-links, said support rollers and said guide rollers.

* * * * *